United States Patent [19]

Yoneda et al.

[11] Patent Number: 5,588,137
[45] Date of Patent: Dec. 24, 1996

[54] DATA FLOW CONTROL APPARATUS AND MEMORY APPARATUS

[75] Inventors: Masato Yoneda; Yoshiaki Shibata, both of Tokyo, Japan

[73] Assignee: Kawasaki Steel Corporation, Hyogo-ken, Japan

[21] Appl. No.: 251,290

[22] Filed: May 31, 1994

[30] Foreign Application Priority Data

| | | | |
|---|---|---|---|
| Jun. 2, 1993 | [JP] | Japan | 5-131944 |
| Jun. 10, 1993 | [JP] | Japan | 5-138635 |
| Jun. 10, 1993 | [JP] | Japan | 5-138756 |
| Jul. 19, 1993 | [JP] | Japan | 5-178044 |

[51] Int. Cl.$^6$ ............ G06F 12/14; H04K 1/00; H04L 9/00
[52] U.S. Cl. ................ 395/490; 380/4; 395/491
[58] Field of Search .............. 364/DIG. 1 MS File; 380/4; 395/490, 491, 375

[56] References Cited

U.S. PATENT DOCUMENTS 4,685,056  8/1987  Barnsdale, Jr. et al. ............... 395/491

FOREIGN PATENT DOCUMENTS

| | | |
|---|---|---|
| 0276450 | 12/1987 | European Pat. Off. . |
| 1-173244 | 7/1989 | Japan . |
| 2-45829 | 2/1990 | Japan . |

*Primary Examiner*—Robert B. Harrell
*Attorney, Agent, or Firm*—Oliff & Berridge

[57] ABSTRACT

There are provided a data flow control apparatus for outputting data through a switchover and a memory apparatus in which such a data flow control apparatus is incorporated. A replacement data is defined for an array of addresses which would not appear sequentially as in a branch instruction and the like. The replacement data is only outputted when the address data are inputted in the order of the array. Thus, it is possible to prevent an illegal copy of softwares.

33 Claims, 32 Drawing Sheets

| A : ADDRESS | D : DATA |
|---|---|
| J − 2 | D (J−2) |
| J − 1 | D (J−1) |
| J | D (J) |
| J + 1 | D (J+1) |
| J + 2 | BREAK |
| ⋮ | |
| J +(n−1) | D (J+(n−1)) |
| J + n | D (J+n) |
| J +(n+1) | D (J+(n+1)) |

Fig. 2

| A : ADDRESS | D : DATA |
|---|---|
| A(j) | D(j) |
| A(j+1) | D(j+1) |
| A(j+2) | D(j+2) |
| ⋮ | ⋮ |
| A(k) | BREAK 1 |
| ⋮ | ⋮ |
| A(m) | BREAK 2 |
| ⋮ | ⋮ |
| A(n) | D(n) |
| A(n+1) | D(n+1) |
| ⋮ | ⋮ |

Fig. 6

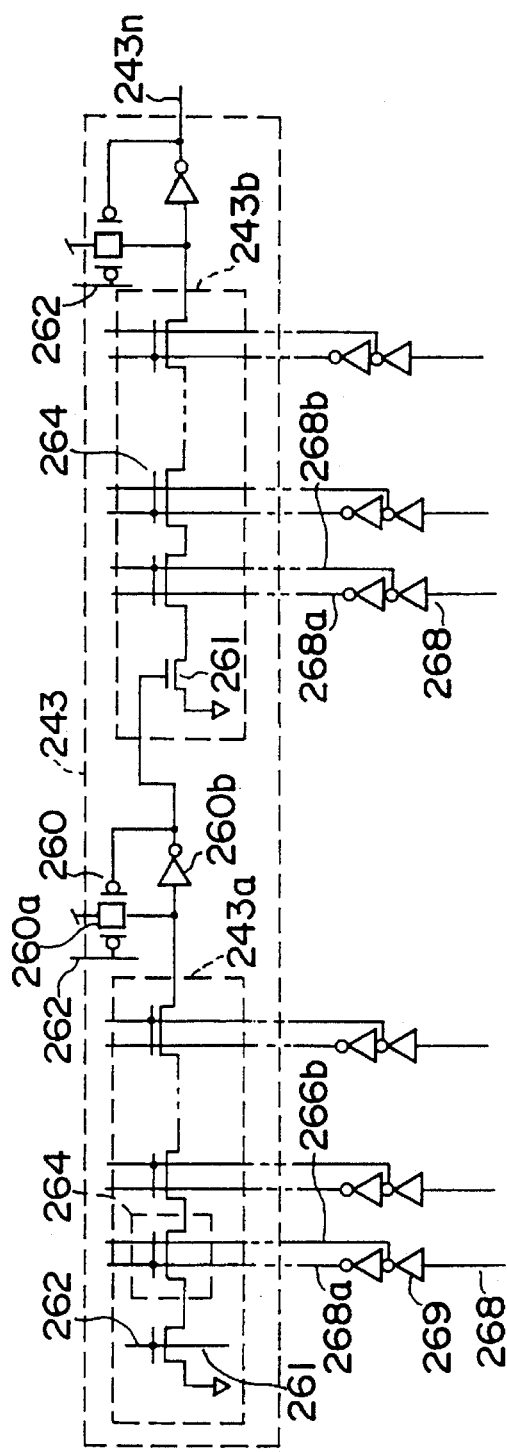
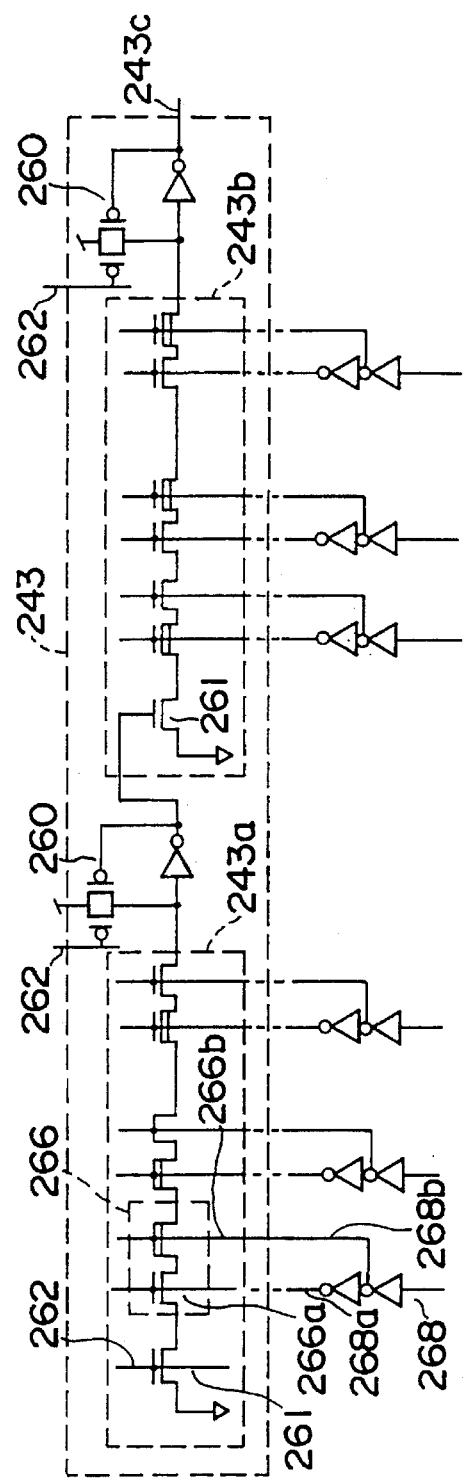
Fig. 10A
Fig. 10B

A : ADDRESS        D : DATA

| A | D |
|---|---|
| A(j) | D(j) |
| A(j+1) | D(j+1) |
| A(j+2) | D(j+2) |
| ⋮ | ⋮ |
| A(k) | D(k, 1) |
| A(k+1) | D(k+1, 1) |
| ⋮ | ⋮ |
| A(m) | D(m) |
| A(m+1) | D(m+1) |

Fig. 17A

A : ADDRESS        D : DATA

| A | D |
|---|---|
| A(k) | D(k, 2) |
| A(k+1) | D(k+1, 2) |

Fig. 17B

| ADDRESS | MNEMONIC | |
|---|---|---|
| .... | ... | |
| 9000 | JSR | 9201 |
| 9003 | | |
| .... | ... | |
| 9100 | JSR | 9201 |
| 9103 | ... | |
| .... | ... | |
| .... | ... | |
| 9200 | RTS | |
| 9201 | ... | |
| .... | ... | |
| .... | ... | |
| 9300 | RTS | |
| .... | ... | |

Fig. 22

| ADDRESS | MNEMONIC | |
|---|---|---|
| start: | | |
| 8000 | - - - | |
| . . . . | - - - | |
| irq_int: | | |
| 8100 | - - - | |
| . . . . | - - - | |
| . . . . | - - - | |
| fffe | org | fffe |
| fffe | dw | irq_int |
| . . . . | - - - | |
| fffc | org | fffc |
| fffc | dw | start |
| . . . . | - - - | |

Fig. 23

| ADDRESS | MNEMONIC | |
|---|---|---|
| . . . . | - - - | |
| 9000 | LDA | [10], Y |
| 9002 | INY | |
| . . . . | - - - | |

Fig. 24

| ADDRESS | MNEMONIC | |
|---|---|---|
| 9000 | JSR | 9201 |
| .... | .... | |
| 9200 | RTS | |
| 9201 | LDA | #00 |
| .... | .... | |
| 9210 | BRA | +5 |
| .... | .... | |
| .... | .... | |
| 9217 | LDA | #00 |
| .... | .... | |
| 9300 | RTS | |

Fig. 25A

| 9201 | LDA | #ff |
|---|---|---|
| .... | .... | |
| 9210 | BNE | +5 |

Fig. 25B

| 9217 | LDA | #88 |
|---|---|---|

Fig. 25C

```
9030 LDA  #00
9032 STA  00
9034 LDA  #20
9036 STA  02
```

```
9030 LDA  1400
9033 BNE  +5
9035 LDA  0200
9038 CMP  #ee
   :
93fd JMP  9500
```

```
9030 STZ  2000
9033 STZ  2002
9036 STZ  2004
9039 STZ  2006
   :
93fd JMP  9600
```

```
9030 LDY  #0000
9033 LDA  #bb00
9036 CMP  2120
9039 BNE  -5
   :
93fd JMP  9700
```

| A : ADDRESS | D : DATA |
|---|---|
| J | D (J) |
| J+1 | D (J+1) |
| J+2 | D (J+2) |
| ⋮ | ⋮ |
| J+(n-1) | D (J+(n-1)) |
| J+n | D (J+n) |
| J+(n+1) | D (J+(n+1)) |

DATA FLOW CONTROL APPARATUS AND MEMORY APPARATUS

BACKGROUND OF THE INVENTION

1. Field of the Invention

The present invention relates to a data flow control apparatus for outputting data through a switchover and a memory apparatus in which such a data flow control apparatus is incorporated, and more particularly to a data flow control apparatus used as means for preventing an illegal copy of softwares in a control system or a game system such as a computer game, and the like, which are controlled by a CPU (Central Processing U nit) and a software, and a memory apparatus in which such a control apparatus is built.

2. Description of the Related Art

For example, as shown in FIG. 33, the conventional control system comprises a CRT 2, a CPU 3, a ROM 4, a terminal 5 and an SRAM 6 which all are coupled to a data bus 1.

According to such a control system, in general, a software is stored in the ROM 4, and is selectively processed in accordance with an instruction for starting the software from the terminal 5. A processing result is displayed on the CRT 2. When it is required during the processing to temporarily store the data, the SRAM 6 is utilized. Alternately, it also happens that a part of the software is down loaded from the ROM 4 on the SRAM 6 and be subjected to the processing by the CPU 3.

The software stored in the ROM 4 is arranged, as shown in FIG. 34, in such a manner that various data "D" are each stored in the associated address "A" indicating the storage address of the data. Thus, the software is executed in the CPU 3 by the use of data D outputted in compliance with the address A issued from the CPU 3.

In the above described control system or a game system adopting such a control system, a portion of the ROM 4 shown in FIG. 33 is detachably arranged on a cassette basis. Thus, when a cassette 9 is interchanged, there is performed a control according to a storage content of the ROM 4 which the cassette 9 is equipped with, or a person may enjoy the game according to the storage content.

A cassette type arrangement of the portion of the ROM 4 for accommodating the software permits the content of the ROM 4 or data D to be outputted to a data line 8 by means of simply applying the address A via an address line 7.

Thus, such a simple structure allows an illegal copy of the software through reading all data D by means of sequentially applying all addresses A. This causes such a serious problem that a profit of a proper rightful person concerning with the software, which would be developed through investing a lot of money and labor and taking up a lot of time, is damaged.

SUMMARY OF THE INVENTION

In view of the foregoing, it is therefore an object of the present invention to provide a data flow control apparatus capable of excluding such an illegal copy and a memory apparatus in which such a data flow control apparatus is incorporated.

To achieve the above-mentioned object, according to the present invention, there is disclosed a data flow control apparatus comprising:

(1_1) a first input terminal for sequentially receiving a first input data;

(1_2) a second input terminal for sequentially receiving a second input data;

(1_3) an output terminal through which output data are sequentially outputted;

(1_4) memory means for storing one or more replacement data which are defined for associated one or more arrays, respectively, each including a plurality of said first input data; and (1_5) data switching means for outputting through said output terminal, as said output data, mutually different data which are selected from among a data group in accordance with whether or not a plurality of said first input data, which include an up-to-date first input data entered through said first input terminal and go back from the up-to-date first input data to their inputted order, correspond to any one of said arrays, where said data group consists of a first output data wherein at least a part of bits or the whole bits of said second input data entered from said second input terminal are replaced by said replacement data defined corresponding to said array, a second output data having the same logic as said second input data entered through said second input terminal, a third output data produced through a logical operation based on said first output data, and a fourth output data produced through a logical operation based on both said first output data and said second output data.

It is acceptable that (2_1) said memory means (1_4) has one or more memory areas for storing said replacement data, and said data switching means (1_5) comprises:

(3_1) data reference means for storing one or more reference retrieval data as an object of retrieval as to whether or not it matches retrieval data including a plurality of said first input data entered sequentially through said first input terminal, and for outputting, when said retrieval data matches any of said reference retrieval data, an access signal to read the replacement data from said memory area in which the replacement data associated with the reference retrieval data detected in match is stored; and (3_2) data output means for outputting through said output terminal, as said output data, mutually different data which are selected from among a data group in accordance with whether or not said access signal is present, where said data group consists of a first output data wherein at least a part of bits or the whole bits of said second input data entered from said second input terminal are replaced by said replacement data read from said memory means, a second output data including said second input data entered through said second input terminal, a third output data produced through a logical operation based on said first output data, and a fourth output data produced through a logical operation based on both said first output data and said second output data.

It is preferable that said reference means (3_1) stores said reference retrieval data defined by a combination of an enhancement transistor and a depletion transistor.

It is preferable that said memory means (3_1) stores said replacement data defined by a combination of an enhancement transistor and a depletion transistor.

It is acceptable that (4_1) said data switching means (1_5) is operative to outputs through said output terminal, as said output data, mutually different data which are selected from among a data group in accordance with whether or not a plurality of said first input data, which include an up-to-date first input data entered through said first input terminal and go back from the up-to-date first input data to their inputted order, contain any one of said arrays when it is permitted to insertion of said first input data, which does not constitute said array, among said first input data which constitute said array, where said data group consists of a first output data wherein at least a part of bits or the whole bits of said second input data entered from said second input terminal are replaced by said replacement data defined corresponding to said array, a second output data having the same logic as said second input data entered through said second input terminal, a third output data produced through a logical operation based on said first output data, and a fourth output data produced through a logical operation based on both said first output data and said second output data.

It is acceptable that (5_1) said memory means (1_4) has one or more memory areas adapted for storing said replacement data, feedback data used for a retrieval of said arrays, and output control data indicating whether or not it is a final stage of the array, and said data switching means (4_1) comprises:

(6_1) a register for storing feedback data read from said memory means;

(6_2) data reference means for storing one or more reference retrieval data as an object of retrieval as to whether or not it matches retrieval data consisting of a pair of said first input data entered through said first input terminal and the feedback data stored in said register, and for outputting, when said retrieval data matches any of said reference retrieval data, an access signal to read the replacement data from said memory area in which the replacement data associated with thereference retrieval data detected in match is stored; and (6_3) data output means for outputting through said output terminal, as said output data, mutually different data which are selected from among a data group in accordance with said output control data among data read from said memory means, where said data group consists of a first output data wherein at least a part of bits or the whole bits of said second input data entered from said second input terminal are replaced by said replacement data read from said memory means, a second output data including said second input data entered through said second input terminal, a third output data produced through a logical operation based on said first output data, and a fourth output data produced through a logical operation based on both said first output data and said second output data.

It is preferable that said reference means (6_2) stores said reference retrieval data defined by a combination of an enhancement transistor and a depletion transistor.

It is preferable that said memory means (5_1) stores said replacement data defined by a combination of an enhancement transistor and a depletion transistor.

It is acceptable that (7_1) said data switching means outputs through said output terminal, as said output data, mutually different data which are selected from among a data group in accordance with whether or not a plurality of said first input data, which include an up-to-date first input data entered through said first input terminal and go back from the up-to-date first input data to their inputted order, contain any one of said arrays when it is permitted to insertion of said first input data, which does not constitute said array, within a predetermined number of pieces, among said first input data which constitute said array, where said data group consists of a first output data wherein at least a part of bits or the whole bits of said second input data entered from said second input terminal are replaced by said replacement data defined corresponding to said array, a second output data having the same logic as said second input data entered through said second input terminal, a third output data produced through a logical operation based on said first output data, and a fourth output data produced through a logical operation based on both said first output data and said second output data.

It is acceptable that (8_1) said memory means (1_4) has one or more memory areas adapted for storing said replacement data, feedback data used for a retrieval of said arrays, distance data representative of said predetermined number of pieces and output control data indicating whether or not it is a final stage of the array, and said data switching means (8_1) comprises:

(9_1) a register for storing circulating data read from said memory means;

(9_2) a counter for storing said distance data read out from said memory means and for terminating the retrieval operation for said array in case where said first input data, which do not constitute said array, are inputted through said first input terminal exceeding said predetermined number of pieces determined by said distance data, up to the subsequent said first input data constituting said array is inputted through said first input terminal after storage of said distance data;

(9_3) data reference means for storing one or more reference retrieval data as an object of retrieval as to whether or not it matches retrieval data consisting of a pair of said first input data entered through said first input terminal and the feedback data stored in said register, and for outputting, when said retrieval data matches any of said reference retrieval data, an access signal to read the replacement data from said memory area in which the replacement data associated with thereference retrieval data detected in match is stored; and (9_4) data output means for outputting through said output terminal, as said output data, mutually different data which are selected from among a data group in accordance with said output control data among data read from said memory means, where said data group consists of a first output data wherein at least a part of bits or the whole bits of said second input data entered from said second input terminal are replaced by said replacement data read from said memory means, a second output data including said second input data entered through said second input terminal, a third output data produced through a logical operation based on said first output data, and a fourth output data produced through a logical operation based on both said first output data and said second output data.

It is acceptable that said reference means (9_3) stores said reference retrieval data defined by a combination of an enhancement transistor and a depletion transistor.

It is acceptable that said memory means (8_1) stores said replacement data defined by a combination of an enhancement transistor and a depletion transistor.

In a data flow apparatus according to the present invention, typically, said first input terminal is for inputting as said first input data address data to be inputted to a memory apparatus for storing various data, and said second input terminal is for inputting as said second input data data outputted from said memory apparatus.

In a data flow apparatus according to the present invention, it is a preferable aspect that said memory means stores said replacement data corresponding to a first array including a plurality of said first input data, and said replacement data corresponding to a second array consisting of one or more said first input data disposed subsequent to a plurality of said first input data constituting said first array and said plurality of first input data. Further, it is also one of the preferable aspects-that said memory means stores a plurality of said replacement data corresponding to a plurality of said arrays each including the same said first input data at the final stage thereof.

A data flow control apparatus according to the present invention can be effectively used through adopting arrays of address in aspects, for example, as shown below:

(a) Said first input data is address data representative of an address on a memory in which an instruction to be executed in a CPU is stored, and said array consists of a plurality of address data representative of a plurality of addresses each including an address in which an instruction to be executed on or before a branch instruction is stored, and an address in which an instruction to be executed after the branch instruction is stored, the instruction stored in the later address being involved in an instruction of a branched side to the address apart from an address in which the branch instruction is stored in accordance with the branch instruction.

(b) Said first input data is address data representative of an address on a memory in which an instruction to be executed in a CPU is stored, and said array consists of a plurality of address data representative of a plurality of addresses each including an address in which an instruction to be executed on or before a subroutine call instruction is stored, and an address in which an instruction to be executed after the subroutine call instruction is stored.

(c) Said first input data is address data representative of an address on a memory in which an instruction to be executed in a CPU is stored, and said array consists of a plurality of address data representative of a plurality of addresses each including an address in which an instruction to be executed on or before a return instruction is stored, and an address in which an instruction to be executed after the return instruction is stored.

(d) Said first input data is address data representative of an address on a memory in which an instruction to be executed in a CPU is stored, and said array consists of a plurality of address data representative of a plurality of addresses each including an address in which a call instruction is stored, and an address in which an instruction to be executed after the call instruction is stored, said call instruction instructing, when a predetermined event occurs, a call of a predetermined routine associated event.

(e) Said first input data is address data representative of an address on a memory in which an instruction to be executed in a CPU and data to be accessed by the CPU are stored, and said array consists of a plurality of address data representative of a plurality of addresses each including an address in which an instruction to be executed on or before a data access instruction to access data on a memory is stored, and an address in which the data accessed by the data access instruction is stored.

As an aspect of a data flow control apparatus according to the present invention, for example, a data flow control apparatus comprising:

(10_1) a first input terminal for sequentially receiving a first input data;

(10_2) a second input terminal for sequentially receiving a second input data;

(10_3) an output terminal through which output data are sequentially outputted;

(10_4) memory means for storing one or more replacement data which are defined for associated one or more arrays, respectively, each including a plurality of said first input data, and feedback data defined corresponding to said first input data included in at least one of said arrays;

(10_5) a register for storing feedback data read from said memory means;

(10_6) a selector for receiving the second input data inputted through said second input terminal and the replacement data read from said memory means to output through said output terminal, as said output data, said second input data, or data wherein at least a part of bits or the whole bits of said second input data entered from said second input terminal are replaced by said replacement data, in accordance with a predetermined control signal;

(10_7) match detection means for storing reference retrieval data, each consisting of a pair of said first input data included in any one of said arrays and said feedback data defined corresponding to said first input data disposed immediately before the associated said input first data, in associated reference retrieval data memory area corresponding to the respective first input data included in any one of said arrays, comparing said reference retrieval data with retrieval data consisting of a pair of said first input data entered through said first input terminal and said feedback data read from said memory means and stored in said register, and outputting a match signal on a signal line associated with said reference retrieval data memory area in which said reference retrieval data matching said retrieval data is stored, and (10_8) control means for providing such a control that upon receipt of said match signal appearing on said signal line, said feedback data, which is defined corresponding to said first input data constituting said reference retrieval data stored in said reference retrieval data memory area associated with said signal line appearing said match signal, is read from said memory means and stored in said register, and in accordance with whether or not said first input data constituting said retrieval data is said first input data disposed at a final stage of any one of said arrays, said replacement data defined for the associated array is read from said memory means so that data wherein at least a part of bits or the whole bits of said second input data entered from said second input terminal are replaced by said replacement data is outputted through said selector, or said second data entered from said second input means is outputted through said selector.

As another aspect of a data flow control apparatus according to the present invention, for example, a data flow control apparatus comprising:

(11_1) a first input terminal for sequentially receiving a first input data;

(11_2) a second input terminal for sequentially receiving a second input data;

(11_3) an output terminal through which output data are sequentially outputted;

(11_4) memory means for storing one or more replacement data which are defined for associated one or more arrays, respectively, each including a plurality of said first input data, feedback data defined corresponding to said first input data included in at least one of said arrays, and distance data defined for said first input data as an index indicating that when said first input data is inputted through said first input terminal, and thereafter first input data, which is disposed immediately after the preceding said first data constituting said array including the entered preceding said first data, is inputted, how many pieces of other said first input data not constituting said array is acceptable to be inputted through said first input terminal, (11_5) a register for storing feedback data read from said memory means;

(11_6) a counter for storing said distance data read out from said memory means and for terminating the retrieval operation for said array when the number of pieces of said other first input data not constituting said array exceeds a number of pieces determined by said distance data through comparing the number of pieces of said other first input data entered through said first input terminal after storage of the distance data with said distance data;

(11_7) a selector for receiving the second input data inputted through said second input terminal and the replacement data read from said memory means to output through said output terminal, as said output data, said second input data, or data wherein at least a part of bits or the whole bits of said second input data entered from said second input terminal are replaced by said replacement data, in accordance with a predetermined control signal;

(11_8) match detection means for storing reference retrieval data, each including a pair of said first input data included in any one of said arrays and said feedback data defined corresponding to said first input data disposed immediately before the associated said input first data, in associated reference retrieval data memory area corresponding to the respective first input data included in any one of said arrays, comparing said reference retrieval data with retrieval data consisting of a pair of said first input data entered through said first input terminal and said feedback data read from said memory means and stored in said register, and outputting a match signal on a signal line associated with said reference retrieval data memory area in which said reference retrieval data match said retrieval data is stored, and (11_9) control means for providing such a control that upon receipt of said match signal appearing on said signal line, said circulating data, which is defined corresponding to said first input data feedback said reference retrieval data stored in said reference retrieval data memory area associated with said signal line appearing said match signal, is read from said memory means and stored in said register and said counter, and in accordance with whether or not said first input data constituting said retrieval data is said first input data disposed at a final stage of any one of said arrays, said replacement data defined for the associated array is read from said memory means so that data wherein at least a part of bits or the whole bits of said second input data entered from said second input terminal are replaced by said replacement data is outputted through said selector, or said second data entered from said second input means is outputted through said selector.

Further, according to the present invention, there is disclosed a memory apparatus comprising:

(12—1) an input terminal for sequentially receiving an input data;

(12—2) an output terminal through which output data are sequentially outputted;

(12—3) a first memory means for storing a plurality of storage data each defined for an associated input data;

(12—4) a second memory means for storing one or more replacement data which are defined for associated one or more arrays, respectively, each including a plurality of said input data; and (12—5) read control means for outputting through said output terminal, as said output data, mutually different data which are selected from among a data group in accordance with whether or not a plurality of input data, which include an up-to-date input data entered through said input terminal and go back from the up-to-date input data to their inputted order, correspond to any one of said arrays, where said data group consists of a first output data wherein at least a part of bits or the whole bits of said storage data defined corresponding to the up-to-date input data are replaced by said replacement data defined corresponding to said array, a second output data having the same logic as said second input data entered through said second input terminal, a third output data produced through a logical operation based on said first output data, and a fourth output data produced through a logical operation based on both said first output data and said second output data.

In the memory apparatus described above, it is acceptable that (13_1) said read control means (12_5) outputs through said output terminal, as said output data, mutually different data which are selected from among a data group in accordance with whether or not a plurality of said input data, which include an up-to-date input data entered through said input terminal and go back from the up-to-date input data to their inputted order, contain any one of said arrays when it is permitted to insertion of said input data, which does not constitute said array, among said input data which constitute said array, where said data group consists of a first output data wherein at least a part of bits or the whole bits of said storage data defined corresponding to the up-to-date input data are replaced by said replacement data defined corresponding to said array, asecond output data having the same logic as said second inputdata entered through said second input terminal, a third output data produced through a logical operation based on said first output data, and a fourth output data produced through a logical operation based on both said first output data and said second output data.

Further, in the memory apparatus described above, it is acceptable that (14_1) said read control means (12_5) outputs through said output terminal, as said output data, mutually different data which are selected from among a data group in accordance with whether or not a plurality of said input data, which include an up-to-date input data entered through said input terminal and go back from the up-to-date input data to their inputted order, contain any one of said arrays when it is permitted to insertion of said input data, which does not constitute said array, within a predetermined number of pieces, between said input data to said data which constitute said array, where said data group consists of a first output data wherein at least a part of bits or the whole bits of said storage data defined corresponding to the up-to-date input data are replaced by said replacement data defined corresponding to said array, a second output data having the same logic as said second input data entered through said second input terminal, a third output data produced through a logical operation based on said first output data, and a fourth output data produced through a logical operation based on both said first output data and said second output data.

In the memory apparatus according to the present invention, typically, address data is inputted.

In the memory apparatus according to the present invention, it is preferable that the "said mutually different data" outputted from said output terminal is data as exemplarily shown below.

(a) Said output data outputted from said output terminal includes data representative of instructions to be executed in a CPU, and said mutually different data outputted from said output terminal are each the same instruction code and representative of instructions of mutually different operands.

(a_1) Said mutually different data are to represent instructions to instruct that mutually different values are set to the same register.

(a_2) Said mutually different data are instructions to instruct that a predetermined value is stored in mutually different memory addresses.

(a_3) Said mutually different data are branch instructions to mutually different addresses.

(b) Said output data outputted from said output terminal includes data representative of instructions to be executed in a CPU, and at least one of said mutually different data outputted from said output terminal are to represent a return instruction.

(c) Said output data outputted from said output terminal includes data representative of instructions to be executed in a CPU, and said mutually different data outputted from said output terminal are to represent mutually different instructions.

(d) Said output data outputted from said output terminal includes data representative of instructions to be executed in a CPU, said data being referred to with a predetermined instruction, and said mutually different data outputted from said output terminal are mutually different values of data which are referred to with said predetermined instruction.

In programs, there is always present such a situation that instructions (data) stored in an address other than adjacent addresses, for example, a jump instruction, a branch instruction to a subroutine and the like, are read out from a ROM, etc. In addition, only a developer of the program knows details of such a situation.

The present invention has been made taking note of this point.

Specifically, assuming that the above noted "first input data" or "input data" are taken as address data, if a replacement data as proper instruction is defined for the associated array of addresses which do not adjacent as in the branch instruction and the like, when a plurality of address data are inputted in accordance with a sequence defined by the program, for example, the replacement data is outputted so that a CPU can execute that replacement data as proper instruction.

On the other hand, if it is intended to read the content of a ROM through providing address data with sequential increment regardless of, for example, a jump instruction and the like, unexpected data or erroneous data will be read out without replacement by the replacement data.

Thus, it is possible to prevent an illegal copy of output data by means of simply sequentially inputting an address data which does not comply with a data processing flow of the software.

Recently, to implement higher speed of processing, there has been proposed a CPU capable of performing a so-called prefetch operation. The prefetch operation is to perform mechanically an advanced reading for data of the subsequent address without waiting for the termination of execution of data or instructions in the CPU. If the instruction in execution is, for example, a branch instruction, the data involved in the advanced reading is abandoned and data corresponding to address of the destination of the branch is again loaded.

According to the present invention, even if, among the first input data (or input data) which constitutes an array, there has been entered the first input data (or input data) which does not constitute such an array, it is possible to recognize the presence of the array. This feature permits the extraction of the array and the output of the proper data, without malfunction even in case of the operation ignoring the processing procedure of the program such as the prefetch operation.

In the data flow control apparatus having data switching means (6_1) to (6_3), the data flow control apparatus having data switching means (9_1) to (9_4), the data flow control apparatus having data switching means (10_1) to (10_8), the data flow control apparatus having data switching means (11_1) to (11_9), and the memory apparatus incorporating any of the above referenced data flow apparatus, according to the present invention, there is so arranged that the feedback data is read from the memory to be used for the subsequent retrieval. Thus, it is possible to define the "array" referred to in the present invention with great freedom in extent from an array consisting of a few pieces of the first input data to an array consisting of a large number of pieces of the first input data.

With respect to the memory means and the data reference means referred to in the data flow control system discussed above and now claimed, in a case where data is defined by the combination of the enhancement transistor and the depletion transistor, even if the LSI, on which the data flow control apparatus or the memory apparatus according to present invention, is dismantled and observed through a microscope and the like, it is impossible to discriminate between the enhancement transistor and the depletion transistor. Consequently, it is more difficult to conduct analysis of the data, thereby more reliably contributing to prevention of the illegal copy of the softwares.

Further, with respect to the "array" referred to in the present invention, assuming that the first input data are given with a, b, c, d, . . . , there may be provided definitions of the array such as a plurality of arrays, which are overlapped in part, for example, an array 'a, b, c' and an array 'a, b, c, d', and a plurality of arrays each having a common final data x of each array, for example, an array 'a, b, x', an array 'c, d, x' and an array 'e, f, x'. These definitions of the array makes the arrays complicated. Consequently, it is more difficult to conduct analysis of the data, thereby more reliably contributing to prevention of the illegal copy of the softwares.

The terminology "mutually different data" referred to in the present invention may refer to such a state that one of which is "normal" data capable of being normally operative, while the other is "abnormal" data which causes the system down and the like. Further, the terminology "mutually different data" may refer to such a state that any of those are "normal" data capable of being normally operative in mutually different scenes in a program flow.

BRIEF DESCRIPTION OF THE DRAWINGS

FIG. 2 is a view exemplarily showing a state of data storage inside a ROM;

FIG. 6 is a view exemplarily showing a state of data storage inside of a ROM;

FIGS. 10A and 10B are each a circuit diagram embodying a match block of a match detection unit of the data flow control apparatus shown in FIG. 8;

FIGS. 17A and 17B are views exemplarily showing states of data storage inside a ROM and a data flow control apparatus, respectively;

FIG. 22 is an illustration showing the relations between addresses for a storage of a program including a subroutine call instruction and a return instruction and mnemonics;

FIG. 23 is an illustration showing the relations between addresses for a storage of a program including a call instruction for instructing a start point of the program when an interruption or a reset is inputted and mnemonics;

FIG. 24 is an illustration showing the relations between addresses for a storage of a program including a data fetch instruction and mnemonics;

FIG. 25A is an illustration showing the relations between addresses for a storage of a program including a subroutine call instruction and a branch instruction and mnemonics, and FIGS. 25B and 25C each illustrate erroneous data stored in the data flow control apparatus;

FIGS. 34 is a view showing a state of data storage inside a ROM involved in the prior art.

DESCRIPTION OF THE PREFERRED EMBODIMENTS

Hereinafter, there will be described embodiments of the present invention.

Figure 1:
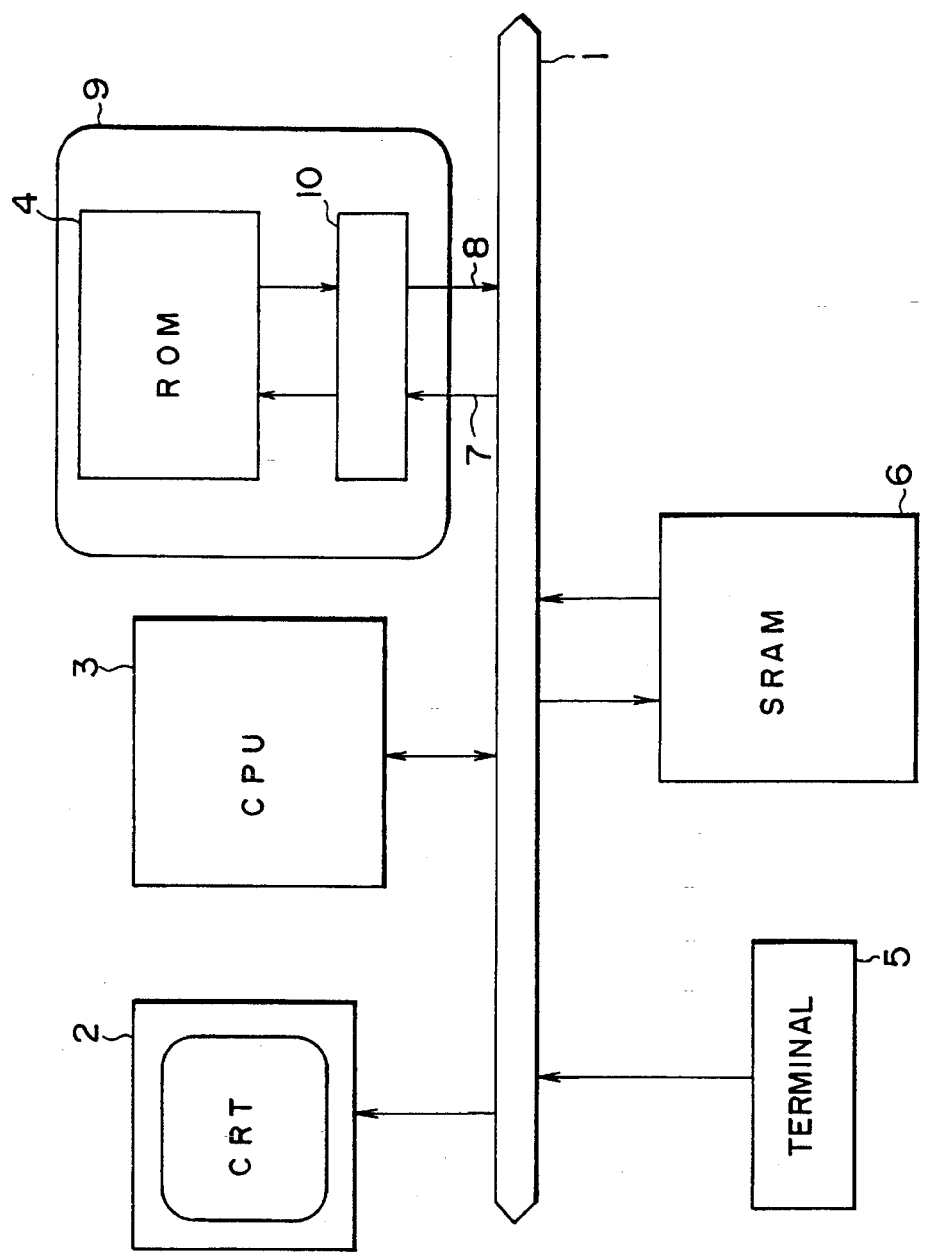
FIG. 1 is a block diagram of a control system adopting a data flow control apparatus according to an embodiment of the present invention.
Figure 33:
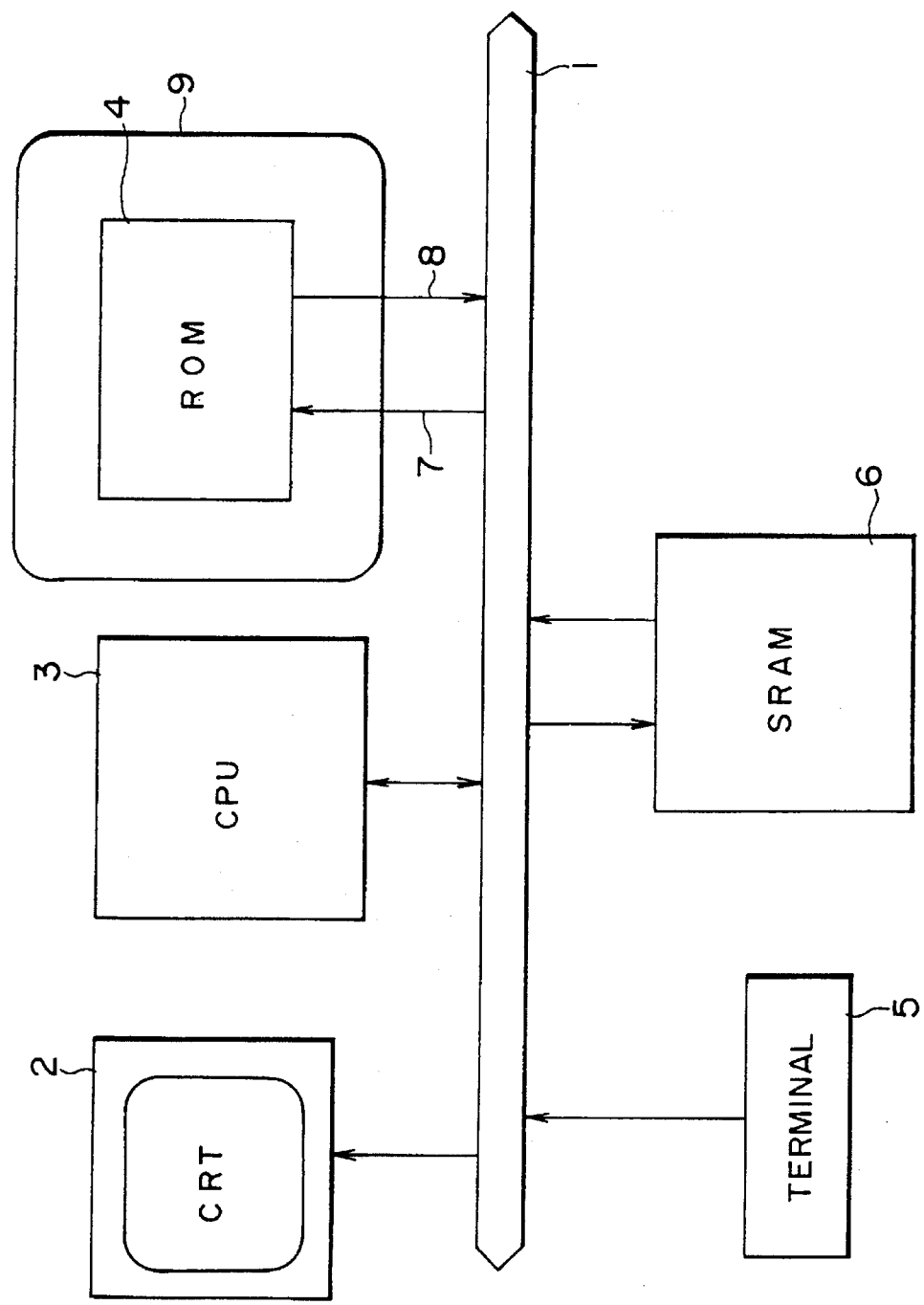
FIG. 33 is a block diagram of the conventional control system.

FIG. 1 is a block diagram of a control system adopting a data flow control apparatus according to an embodiment of the present invention. In FIG. 1, the same parts are denoted by the same reference numbers as those of FIG. 33 related to the prior art.

In FIG. 1, it should be noticed that the cassette 9 comprises the ROM 4 and a data flow control apparatus 10. Consequently, it is possible to provide an arrangement wherein the address line 7 and the data line 8, which are led out of the cassette 9, are not different from the conventional one. Thus, it is possible to use the conventional control system or the game system as it is except for the cassette 9.

Hereinafter, the first embodiment of the data flow control apparatus 10 shown in FIG. 1 will be described in details.

In the ROM 4, as shown in FIG. 2, there are stored data D each corresponding to the associated address A. Address data are inputted via the address line 7 through the data flow control apparatus 10 to the ROM 4. Likewise, output data from the ROM 4 are outputted through the data flow control apparatus 10 to the data line 8. Of course, it is acceptable to directly connect to the ROM 4 all or a part of the address line 7, or a part of the data line 8.

Assuming that a sequence of input of the address data is given by J–2→J–1→J→J+2 in accordance with a normal operation of the software, in the data flow control apparatus 10, there is defined in advance a proper data D (J+2) corresponding to a combination (J–2, J–1, J, J+2) of a plurality of address data, whereas in the ROM 4 there is defined in advance data 'BREAK' corresponding to the address data J+2, which 'BREAK' causes a system down.

Figure 3:
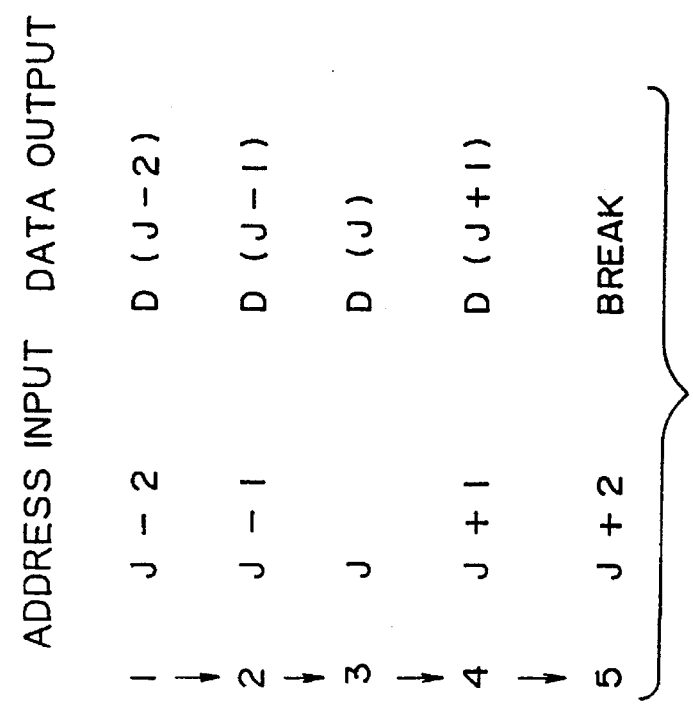
FIGS. 3A and 3B are each a flowchart of a data output to an address input.

According to such a software, a processing procedure for address during an operation of the control system and the output data are provided as shown in FIG. 3A. Specifically, for the address data J–2, J–1 and J, the associated data D (J–2), D (J–1) and D (J) stored in the ROM 4 are outputted, respectively. For the subsequent address data J+2, the associated data stored in the ROM 4 is given with the 'BREAK' which causes a system down. However, the data 'BREAK' is inhibited from being outputted by the data flow control apparatus 10. Instead the data D (J+2) is outputted to the data line 8. Thus, the normal operation is continued. On the other hand, in a case where an unfair copy practice for data is conducted, the addresses are simply sequentially inputted, without analysis of the actual processing procedure of the software or the flow of the addresses, so as to read the data outputted corresponding to the inputted addresses. In this case, the output data corresponding to the respective addresses are provided as shown in FIG. 3B, since there occurs no replacement of data through the combination (J–2, J–1, J, J+2) of the address data. Thus, it is simply possible to obtain only 'BREAK' as the data corresponding to the address J+2. As a result, if the software is operated with such a data, this causes a system down at a certain time point.

In this manner, according the first embodiment of the present invention, there are noticed two points one of which is concerned with a discontinuity of the address which will exist in actual operation of the software, and the other a relevancy of the addresses such that data from a plurality of addresses are necessary for a series of processing. From this point of view, an output data related to a specific address is associated with not only an up-to-dately inputted address data but also before inputted address data, and a combination of such a plurality of address data is defined as a key data. The data flow control apparatus 10 beforehand stores data corresponding to the key data. Whereas the usual ROM 4 beforehand stores a dummy data, for example, the 'BREAK' which causes a system down, as mentioned above. This makes it difficult for the third party to identify the dummy data and the key data, because the third party is not the developer of software program who should know all the procedure of the software.

According to the present embodiment, as the key data of D (J+2), a combination of addresses J–2, J–1, J and J+2 associated with itself is defined. The output of the proper data D (J+2) is only permissible, when these four address data are inputted in the named order. However, it is acceptable to vary the number of address data to form a definition of the key data, and/or to increase the number of data to be replaced by means of increasing the number of key data. These modifications make it more difficult to conduct the illegal copy.

The data flow control apparatus 10 according to the first embodiment of the present invention will be described in detail referring to FIGS. 4 and 5.

To simplify the explanation, it is assumed that 2 bits of address is inputted through the address line 7, 2 bits of output data is outputted through data lines 8a and 8b, and 2 bits of output data from the ROM 4 is inputted through output data lines 42a and 43a. Further, it is assumed that the key data (a retrieval data matched a defined array) is composed of a pair of two pieces of 2 bits of address, and an output data (0, 1) is outputted for a key data consisting of a combination of two pieces of address data (0, 0)→(1, 1), while an output data (1, 0) is outputted for a key data consisting of a combination of two pieces of address data (1, 0)→(0, 0). In case of other than two pairs of combinations, the output data outputted from the ROM 4 to the output data lines 42a and 43a are directly outputted. And, directly connected to the ROM 4 is an address line (not illustrated) which is branched from the address line 7.

The data flow control apparatus 10 is equipped with a selector 46 of which outputs are connected to the data lines 8a and 8b. One of the two pairs of inputs applied to the selector 46 is coupled to the output data lines 42a and 43a, and the other to data output lines 42b and 43b. The selector 46 includes two pieces of a pair of n-channel transistor and p-channel transistor. When a binary number "0" (the absence of the input of the key data) appears on a selector control signal line 51, the output data lines 42a and 43a from the ROM 4 are coupled to the data lines 8a and 8b, respectively, so that the output data of the ROM 4 are directly outputted. On the other hand, when a binary number "1" (the presence of the input of the key data) appears on a selector control signal line 51, the data output lines 42b and 43b are coupled to the data lines 8a and 8b, respectively, so that the output data of the data flow control apparatus 10 are outputted.

In the present embodiment, for the purpose of the simplification, there is used the selector 46. It is acceptable, however, to replace the selector 46 by an selector 46 is coupled to the output data lines 42a and 43a, and the other to data output lines 42b and 43b. The selector 46 includes two pieces of a pair of n-channel transistor and p-channel transistor. When a binary number "0" (the absence of the input of the key data) appears on a selector control signal line 51, the output data lines 42a and 43a from the ROM 4 are coupled to the data lines 8a and 8b, respectively, so that the output data of the ROM 4 are directly outputted. On the other hand, when a binary number "1" (the presence of the input of the key data) appears on a selector control signal line 51, the data output lines 42b and 43b are coupled to the data lines 8a and 8b, respectively, so that the output data of the data flow control apparatus 10 are outputted.

In the present embodiment, for the purpose of the simplification, there is used the selector 46. It is acceptable, however, to replace the selector 46 by an arithmetic processing unit. Further, it is acceptable to arrange the system in such a way that when the key data is inputted, what is replaced by the data of the data flow control apparatus 10 is only a part of bits of the data outputted from the ROM 4, for example, the output data line 43a is directly connected to the data line 8b without passing through the selector 46.

The data output lines 42b and 43b are connected to outputs of the usual dynamic sense amplifiers 52, respectively. The usual dynamic sense amplifiers 52 is operative generally in such a manner that first, bit lines 152 each corresponding to an input of the associated inverter 151 are pre-charged through pre-charge transistors 153, respectively, and variations in potential on the bit lines 152 are detected through memory cells M11, M12, M21 and M22. According to the present embodiment, in the memory cells M11, M12, M21 and M22, the expression of data "1" and "0" depends on the fact that the transistors each connected in series to the associated control transistor 154 are each a depletion type transistor Td or an enhancement type transistor Te. More specifically, when an address data of group (two sets of address data=4 bits in case of the present embodiment) is inputted, one of control word lines 155 takes a logical level "1", and in addition the selected one of word lines W1 and W2 connected to the memory cells M11, M12, M21 and M22 takes a logical level "0" in potential. Now assuming that the word line W1 takes the logical level "0", the memory cells M11 and M12 are selected, which are the enhancement type transistor Te and the depletion type transistor Td, respectively, so that the memory cell M11 is non-conductive and the M12 memory cell M12 is conductive to the ground line. Thus, only the bit line 152 on the right of two bit lines 152 in the figure is grounded. As a result, since the dynamic sense amplifiers 52 output the inverted signals, the binary numbers "0" and "1" appear on the data output lines 42b and 43b, respectively.

At that time, one of the two control word lines 155 (here the control line of the upper part of the two control word lines 155 in the figure) takes the logical level "1". Thus, a select control transistor 156, which is connected to the control word line 155 taking the logical level "1", turns on, so that a selection control signal detection line 157, which has been pre-charged, takes the logical level "0". This logical level "0" is detected by the dynamic sense amplifiers 52, and as a result the selector control signal line 51 takes the logical level "1". Thus, the selector 46 is switched over to the data output lines 42b and 43b side so that the data (0, 1) from the memory cell M11 and M12 are outputted to the data line 8a and 8b, respectively.

The above description has been made in connection with the data output section (half the right in the figure) of the data flow control apparatus 10. Next, the key data reference section (half the left in the figure), which controls the data output section, will be described hereinafter.

First, address data inputted through the address line 7 is applied to a shift register 47. Connected to the address line 7 is an ATD (Address Transaction Detector) 48 for detecting variations of the address data. Signals generated from the ATD 48 are supplied to the shift register 47 and in addition a control circuit 49 for producing control signals, which appear on a control signal line 50, to control overall the apparatus.

First, when address data is inputted through the address line 7, the ATD 48 detects the variation of the address data through inputting the new address data and generates an output signal which causes the new address data to be stored in the shift register 47 whenever the address data varies. According to the present embodiment, the shift register 47 comprises two registers D1 and D2 each of 2 bits for storing two sets of address data each consisting of 2 bits. The registers D1 and D2 are adapted to store such two sets of address data in the order of inputting, that is, to always store two sets of address data on a time sequence basis.

The address data stored in the shift register 47 are supplied to an inverter group 141 in units of bits in which a normal signal and an inversion signal are produced on each bit. Output signals of the inverter group 141 are supplied to a match detection circuit 142 which adopts, by way of example, a dynamic NAND decoder. In the dynamic NAND decoder, a pair of enhancement type transistor Te and the depletion type transistor Td is provided in unit of bits, and the corresponding 4 bits or 4 pairs of these transistors are serially connected. One end of the serially connected transistors is connected to the dynamic sense amplifier 52 which is the same as that mentioned above, and the other end is connected to a control transistor 143.

As described above, the dynamic sense amplifier 52 serves to pre-charge an input side of the inverter 151 and detects variations in potential there. Hence, for providing such a situation that the potential is given with the logical level "0", and thus the output of the inverter 151 is given with the logical level "1", it is necessary that all of the enhancement type transistors Te and the depletion type transistors Td, which are serially connected to constitute the dynamic NAND decoder, turn on and in addition the control transistor 143 turns on. An output of the dynamic sense amplifier 52 only becomes "1", when such a condition is satisfied. And as described above, one of the control word lines 155 becomes "1", so that the memory section of the data flow control apparatus 10 is selected to be outputted by the selector 46.

With respect to the condition that all of the transistors of the dynamic NAND decoder turn on, it will be described referring to a pair of transistors consisting of a depletion type transistor Td and an enhancement type transistor Te which appear left upper in the figure.

The gates of these transistors are connected to a normal data line 144 and an inversion data line 145 of one bit of data of the address data, respectively. In view of the fact that the depletion type transistor Td turns on, even its gate is given with the logical level "0" in voltage, both the transistors serially connected in the form of a pair turn on when a voltage of the logical level "1" is applied to the gate of the enhancement type transistor Te, in other words, when the one bit of the address takes the binary number "0". In this manner, the dynamic NAND decoder shown upper the left in the figure turns on whenever two sets of address data take (0, 0)→(1, 1), so that data (0, 1) is outputted from the memory section. Also, with respect to the other dynamic NAND decoder below, when address data (0, 0)→(1, 1) are inputted, an output of the dynamic sense amplifier 52 becomes "1", and thus data (0, 1) is outputted from the memory section. At that time, of course, the control signal line 50 takes the logical level "1", so that the control transistor 143 turns on.

Figure 4:
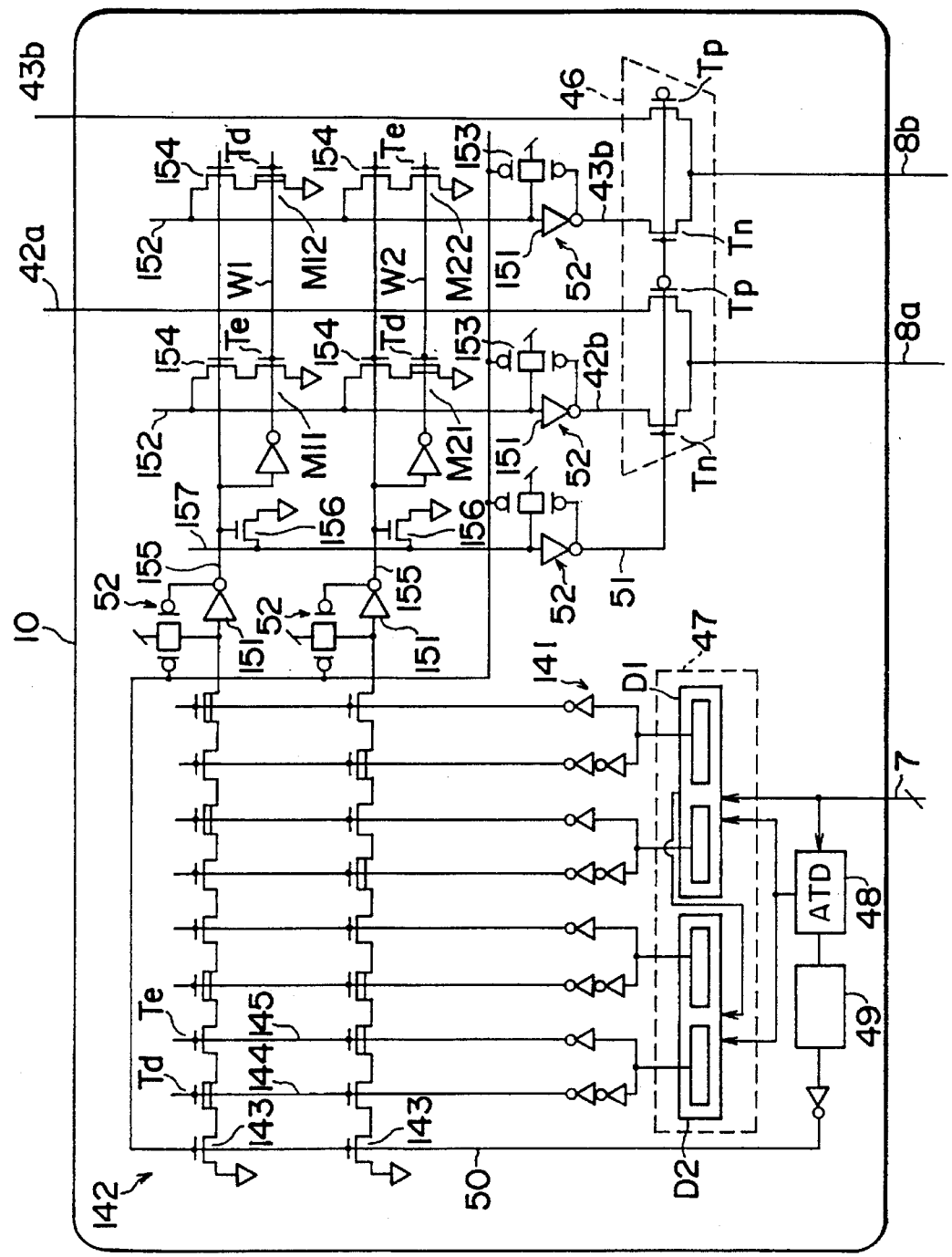
FIG. 4 is a schematic circuit diagram of a data flow control apparatus according to the first embodiment of the present invention.
Figure 5:
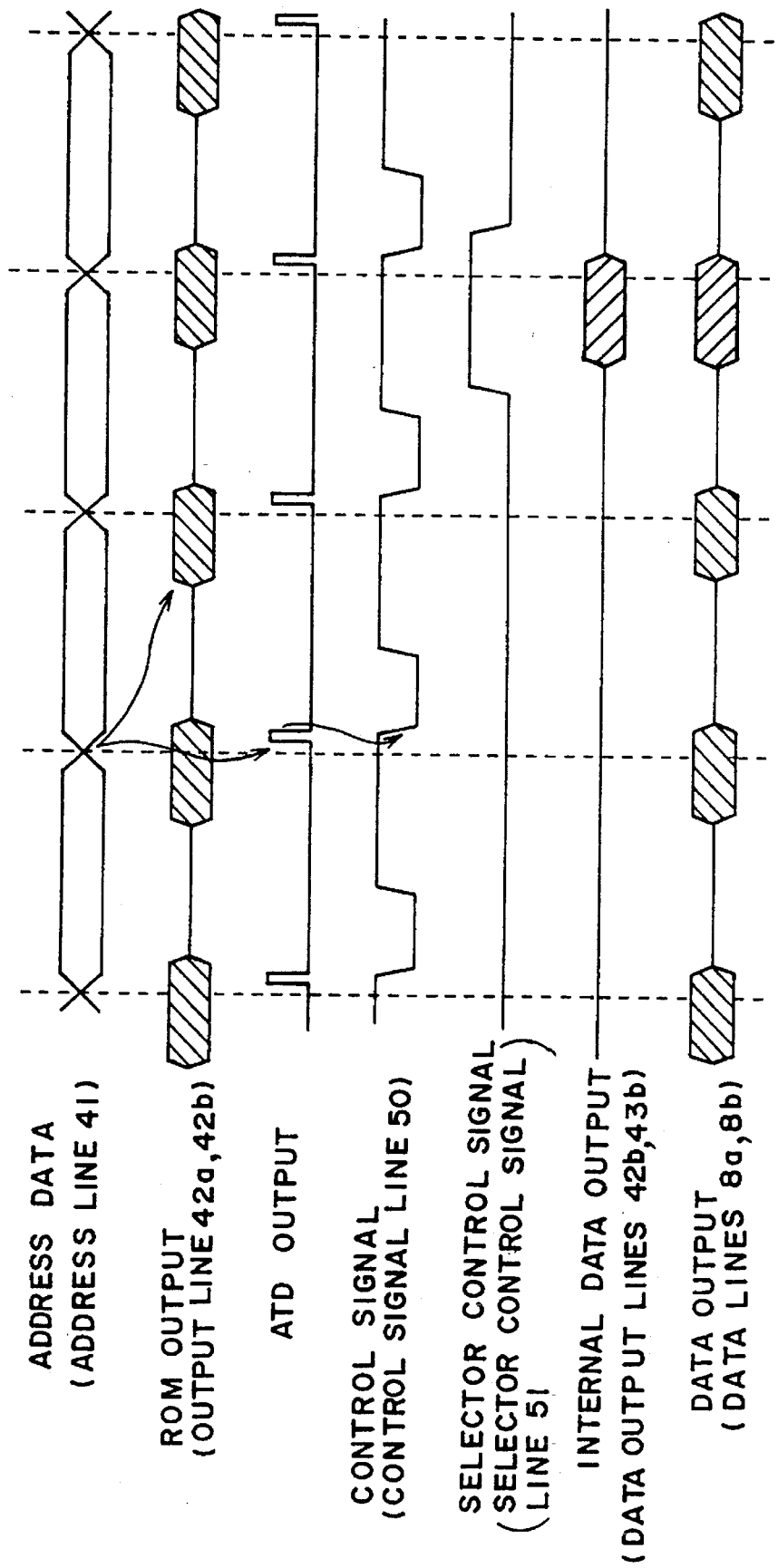
FIG. 5 is a time chart useful for understanding the data flow control apparatus shown in FIG. 4.

FIG. 5 is a time chart useful for understanding the data flow control apparatus shown in FIG. 4. When address data is applied to the data flow control apparatus 10 and the ROM 4 (FIG. 1) via the address line 7, the associated output data is read out from the ROM 4 via the data lines 42a and 43a to the data flow control apparatus 10. Simultaneously, the ATD 48 detects the address variation and generates a pulse. The control signals as shown in FIG. 5 are produced on the basis of the thus generated pulses, and the address data are inputted to the shift register 47. If the entered address data does not match the key data stored in the dynamic NAND decoder, the selector control signal maintains the logical level "0", so that the output data is outputted from the ROM 4 directly to the data lines 8a and 8b.

On the other hand, if the entered address data matches the key data stored in the dynamic NAND decoder, the selector control signal becomes the logical level "1", so that the internal data is outputted from the memory section of the data flow control apparatus 10 to the data lines 8a and 8b. It is possible to define the key data and the associated output data by means of selecting the use of the enhancement type transistors Te in the dynamic NAND decoder and the memory section of the data flow control apparatus 10.

It should be noticed that the above-mentioned circuit system is shown simply by way of example, and as a matter of course it is acceptable to adopt other well known circuit systems.

Further, according to the present embodiment, the data flow control apparatus 10 is arranged independently of the ROM 4. It is acceptable, however, to incorporate the data flow control apparatus 10 into the memory apparatus such as the ROM 4 and the like.

Next, the second embodiment of the data flow control apparatus 10 will be described.

Figures 7A, 7B:
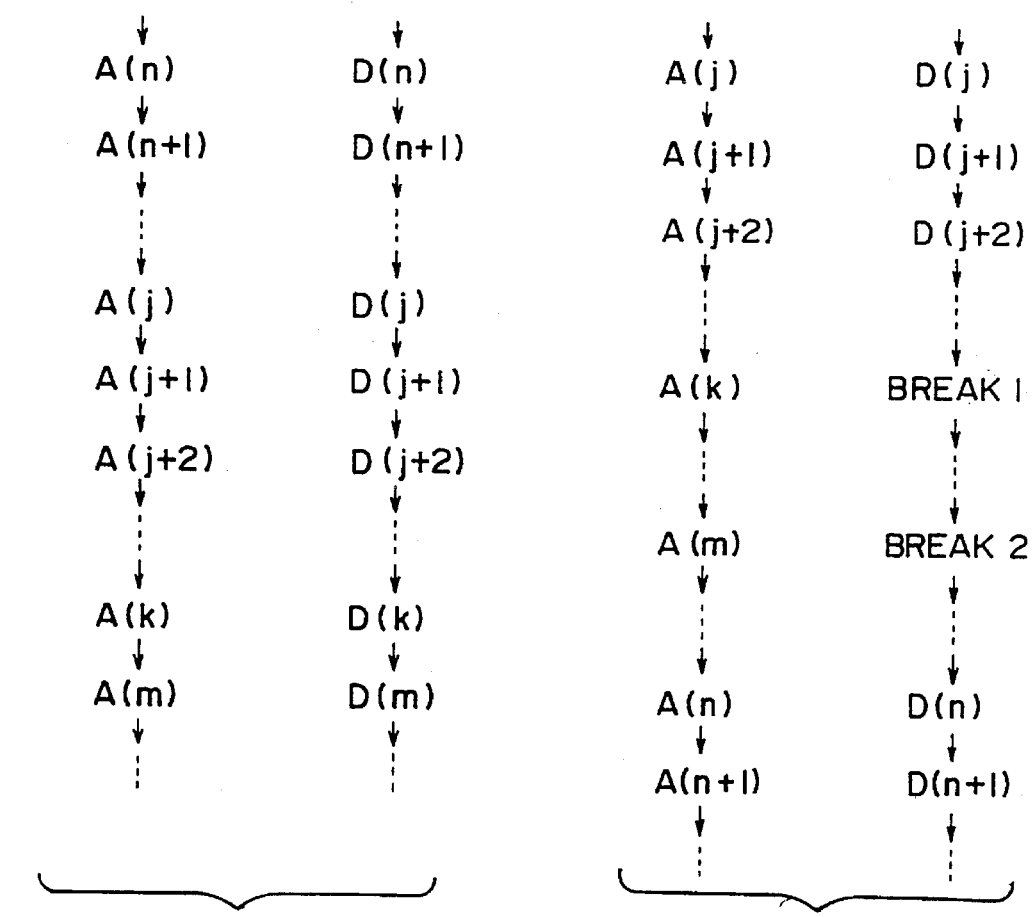
FIGS. 7A and 7B are each a flowchart of a data output to an address input.

It is assumed that as shown in FIG. 6 the ROM 4 stores in addresses A the associated data D, respectively, and as shown in FIG. 7A the address data are sequentially inputted, under normal operation of the software, in the order of A (n)→A (n+1)→ . . . →A (j)→A (j+1) →A (j+2)→ . . . →A (k)→A (m). Here, the following two arrays are noticed. That is, the first array is concerned with {A (n), A (j), A (k)} which is formed through thinning the full sequence of the address data in the named order, and the second array is concerned with {A (n), A (j), A (k), A (m)} which is formed through adding the address data A (m) to the first array. Proper data D(k) and D(m), which are associated with the two arrays {A (n), A (j), A (k)} and {A (n), A (j), A (k), A (m)}, respectively, are defined in advance for the addresses A (k) and A(m) in the data flow control apparatus 10, respectively. On the other hand, in the ROM 4 'BREAK 1' and 'BREAK 2', which cause the system down, are defined in advance for the addresses A (k) and A(m), respectively.

A processing procedure for addresses during an operation of the control system and the output data, according to such a software, are provided as shown in FIG. 7A. Specifically, for the address data other than the address data A (k) and A (m), the associated data stored in the ROM 4 are outputted, respectively. However, when the address data A (k) and A (m) are inputted, the data 'BREAK 1' and 'BREAK 2', which cause the system down, are inhibited from being outputted from the ROM 4. Instead the data D (k) and D (m) are outputted. Thus, the normal operation is continued. On the other hand, in a case where an unfair copy practice for data is conducted, the addresses are simply sequentially inputted, without analysis of the actual processing procedure of the software or the flow of the addresses, so as to read the data outputted corresponding to the inputted addresses. In this case, the output data corresponding to the respective addresses are provided as shown in FIG. 7B. Thus, it is simply possible to obtain only 'BREAK 1' and 'BREAK 2' as the data corresponding to the addresses A (k) and A (m). As a result, if the software is operated with such a data, this causes a system down at a certain time point.

In this manner, according the second embodiment of the present invention, there are noticed two points one of which is concerned with a discontinuity of the address which will exist in actual operation of the software, and the other a relevancy of the addresses such that data from a plurality of addresses are necessary for a series of processing. From this point of view, an output data related to a specific address is associated with not only an up-to-dately inputted address data but also before inputted address data, and a combination of such a plurality of address data is defined as a key data. The data flow control apparatus 10 beforehand stores data corresponding to the key data. Whereas the usual ROM 4 beforehand stores a dummy data, for example, the 'BREAK 1' and 'BREAK 2' which cause a system down, as mentioned above. This makes it difficult for the third party who does not know the processing procedure of the software to identify the dummy data and the key data.

According to the present embodiment, as the key data of D (k), a sequence of three address data A (n), A (j) and A (k) associated with itself is defined, and as the key data of D (m), a sequence of four address data A (n), A (j), A (k) and A (m) associated with itself is defined. The output of the proper data D (k) and D (m) is only permissible, when these three or four address data are inputted in the named order. However, the arrays of address data are not restricted to the above-mentioned arrays of three or four address data by way of example, and it is possible to optionally select a desired number of addresses and/or a desired location of addresses from among a plurality of addresses to be accessed for a series of processings, so that dummy data are stored in the ROM 4 while the proper data and the associated key data are stored in the data flow control apparatus 10. Further, it is acceptable to vary the number of address data to form a definition of the key data, and/or to increase the number of data to be replaced by means of increasing the number of key data. These modifications make it more difficult to conduct the illegal copy.

The data flow control apparatus 10 according to the second embodiment of the present invention will be described in detail referring to FIGS. 8 and 9.

Address data are inputted via the address line 7 to a match detection unit 241, while data stored in a feedback register 242 is inputted to the match detection unit 241. Thus, activated is a word line 243w of a match block 243 of which a content matches both the data stored in the feedback register 242 and the entered address data. As a result, the associated memory block 245 is selected.

Each of the memory blocks 245 comprises a feedback register control flag 245a, a feedback data 245b, an output data 245c and a selector control flag 245d. The match blocks 243 each comprise an address data match section 243a and a feedback data match section 243b.

First, the address data A (n) is inputted to the match detection unit 241 in which data A (n) is stored in the address data match section 243a of the fourth match block 243. The feedback data match section 243b of the fourth match block 243 is set up to be a "don't care" state in which it is considered that a match is available for any data. As a result, there occurs a match on the fourth match block 243, so that the word line 243w is activated to select the fourth memory block 245 whereby the storage data are read out. Since the selector control flag 245d of the storage data is given with the binary value "0", the selector 246 permits the output signal passed via the data input line 247 from the ROM 4 to be outputted to the data line 8. The number "1" of the feedback data 245b is inputted to the feedback register 242 on the basis of a feedback register control signal which is produced by means of delaying the binary signal "1" of the feedback register control flag 245a through a delay circuit 248. This state is represented by time T1 in the time chart of FIG. 9. In the same figure, outputs of the ATD and control signals are useful for controlling overall the data flow control apparatus 10. Those signals may be produced in such a way that the variations in the address data are detected by the control circuit 249, and the detected information is used to form those signals.

Further, a plurality of address signals are inputted via the address line 7 to the data flow control apparatus 10 and the ROM 4 as well. From the ROM 4 there are outputted data according to the associated addresses, respectively. As far as the address signal A (j) is not entered, there is no match in the match detection unit 241 of the data flow control apparatus 10. Thus, the selector 246 always permits the output from the ROM 4 to be passed via the data line 8.

The feedback register control signal is also always "0", and thus the binary value of the feedback register 242 maintains "1". When the address signal A (j) is inputted, there occurs a match on address data match section 243a of the second match block 243 of the match detection unit 241. Whereas, the feedback data match section 243b is set up beforehand with the number "1", and thus the input data this number also. As a result, the word line 243w of the second match block 243 rises up to select the second memory block 245 whereby the storage data are detected. Since the selector control flag 245d of this memory block 245 is given with the binary number "0", the selector 246 permits the data from the ROM 4 to be passed via the data line 8. At that time, the feedback register control flag 245a is given with the binary value "1", and the feedback data 245b is given with the number "2". Thus, the number "2" of the feedback data 245b is transmitted to the feedback register 242 (T2 in FIG. 9).

Likewise, up to the time point that the address data A (k) is inputted, the output from the ROM 4 are outputted through the selector 246 via the data output line 8.

When the address data A (k) is inputted, there occurs a match on address data match section 243a of the fifth match block 243 of the match detection unit 241. Whereas, the feedback data match section 243b is set up beforehand with the number "2", and thus the input data matches this number also. As a result, the word line 243w of the fifth match block 243 rises up to select the fifth memory block 245 whereby the associated data are detected. Since the selector control flag 245d of this memory block 245 is given with the binary number "1", the selector 246 inhibits the data from the ROM 4 from being passed via the data line 8. Instead the value of the output data 245c corresponding to the fifth match block 243, that is, the data D (k) is outputted through the selector 246.

At that time, the feedback register control flag 245a is given with the binary value "1", and the feedback data 245b is given with the number "3". Thus, the number "3" of the feedback data 245b is transmitted to the feedback register 242 (T3 in FIG. 9).

Figure 9:
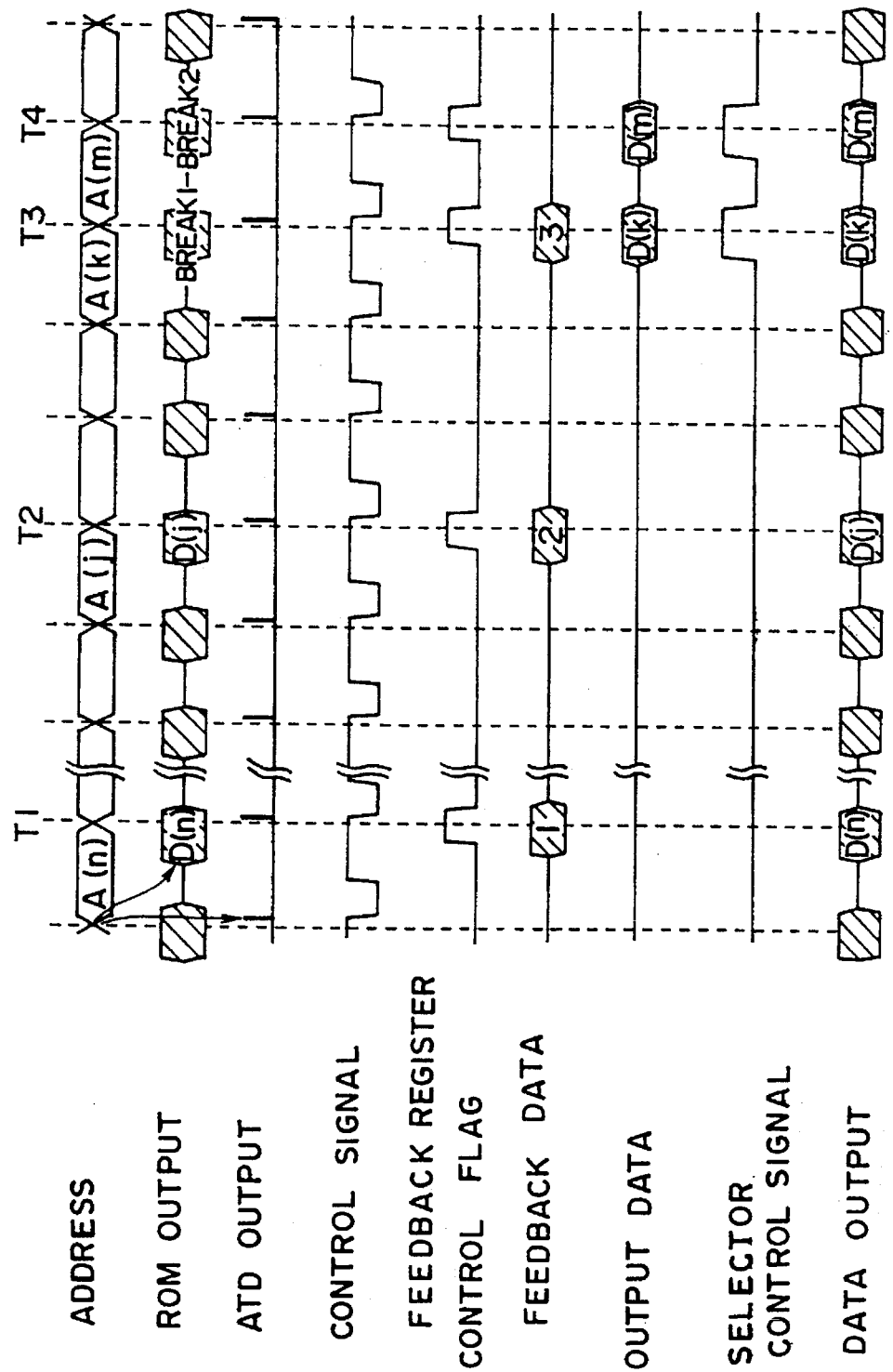
FIG. 9 is a time chart useful for understanding the data flow control apparatus shown in FIG. 8.

In the similar fashion, when the address data A (m) is inputted, the data D (m) stored in the data flow control apparatus 10 is outputted instead of the output from the ROM 4 (T4 in FIG. 9).

In this manner, according to the present embodiment, the output data is not determined by only the current address entered, but for a specified address the output of data is determined by an address sequence in the execution of a software before entered. Thus, it is rendered possible to prevent an unfair copy practice from being conducted.

Further, according to the present embodiment, there is so arranged that even unexpected any single or plural address data follow, for example, the address data A (n), as shown by way of example, the subsequent address data as a key data is always monitored. Consequently, also for the advanced reading of data by successive addresses taking no account of a processing procedure of a software in a prefetch operation of a CPU for a higher speed processing, it is possible to implement an extraction of suitable key data and an output of proper data, without malfunction.

Next, referring to FIGS. 10A and 10B there will be explained the circuits embodying a match block of a match detection unit of the data flow control apparatus shown in FIG. 8.

Figure 8:
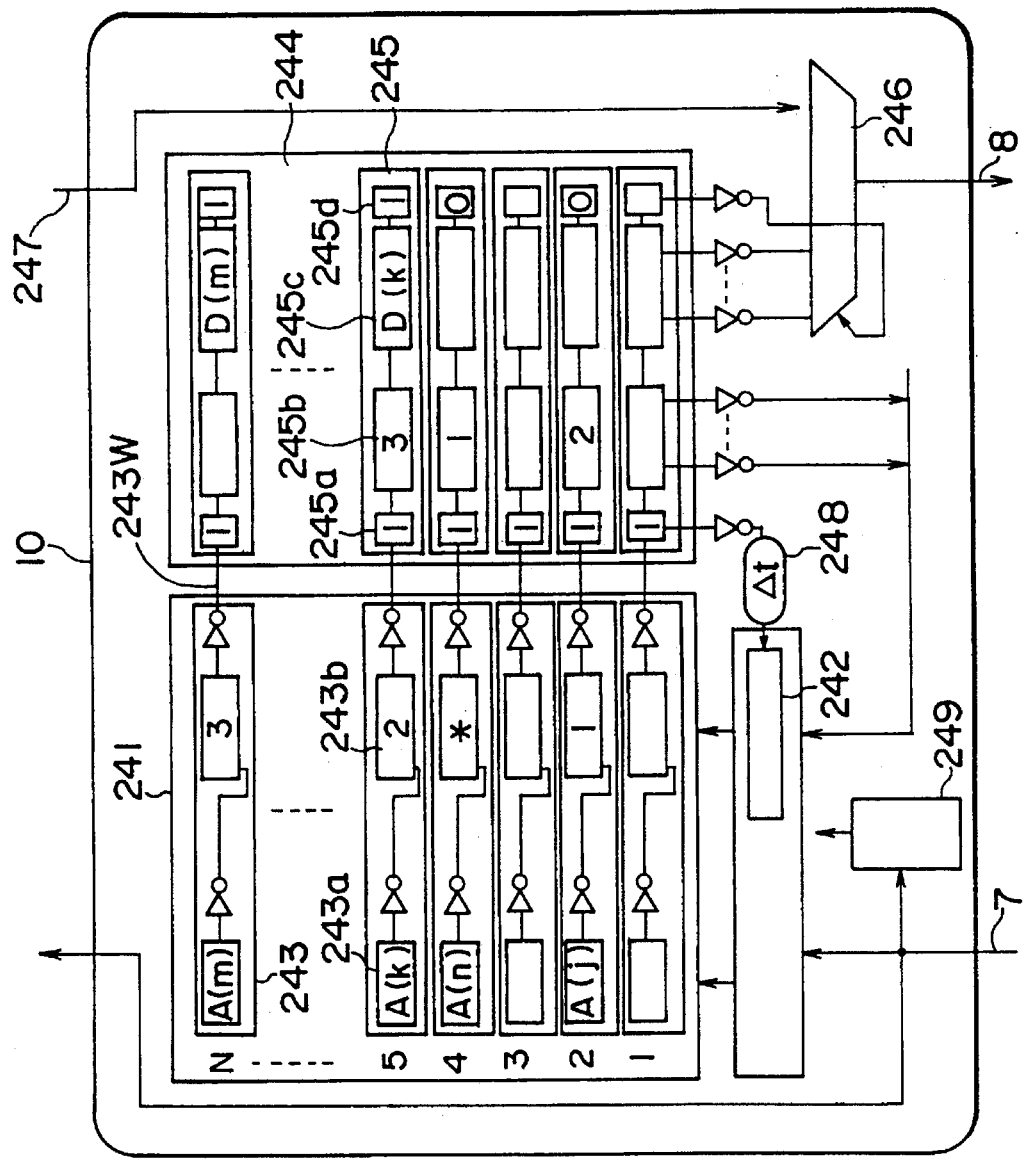
FIG. 8 is a schematic circuit diagram of a data flow control apparatus according to the second embodiment of the present invention.

FIGS. 10A and 10B are each a circuit diagram embodying the match block 243 of the match detection unit 241 of the data flow control apparatus shown in FIG. 8. The circuits shown in FIGS. 10A and 10B have each an arrangement by a programmable decoder, and adopts a dynamic NAND circuit in which a plurality of input transistors are connected in series for the purpose of a compact design.

According to the circuit shown in FIG. 10A, a plurality of enhancement type transistors 264 are connected in series. It is defined whether the transistor 264 matches the binary value "1" or "0" depending on the fact that the gate of the transistor 264 is connected to a positive logical line 268a or a negative logical line 268b. One end of the serially connected enhancement type transistors 264 is connected to a control transistor 261, and the other end to a dynamic sense amplifier 260, which elements are controlled through control signal line 262. An operation of the circuit will be described taking the address data match section 243a by way of example.

When the binary signal "0" is applied to the control signal line 262, the control transistor 261 turns off, while a pre-charge transistor 260a of the dynamic sense amplifier 260 turn on, so that an input node of an inverter 260b is charged, whereby the input node takes the binary value "1" and the output takes "0".

At that time, the address signal has already been applied to each of the serially connected enhancement type transistors 264.

When the control signal line 262 changes in state to take the binary value "1", the control transistor 261 turns on, while the pre-charge transistor 260a turns off.

At that time, if the input address signal is equal to the defined data determined by the connecting condition of the signal line to the gate of the serially connected enhancement type transistor 264, for example, if the gate is connected to the positive logical line 268a, and the input address data signal takes the binary value "1", that enhancement type transistor 264 turn on. Likewise, if the gate is connected to the negative logical line 268b, and the input address data signal takes the binary value "0", that enhancement type transistor 264 also turn on. That is, when the input address signal matches the connecting condition of the gate, the enhancement type transistor 264 turn on. However, when mismatch is brought, the gate is given with "0" and is kept turning off.

When the input address signal matches the connecting conditions of all of the serially connected enhancement type transistors 264, all of the transistors 264 turn on to discharge an electric charge on the input node of the inverter 260b of the dynamic sense amplifier 260, so that the input node of the inverter 260b becomes the binary value "0". The signal "0" of the input node of the inverter 260b is inverted by the inverter 260b. Thus, a match signal "1" is outputted.

The match signal "1" is applied to a gate of the control transistor 261 of the feedback data match section 243b constructed of the dynamic NAND circuit of the next stage.

In this manner, the control transistor 261 of the feedback data match section 243b turns on. In the similar way as described above, when the inputted feedback data matches the data defined by the connecting condition of the gate of the serially connected enhancement type transistor 264, the binary signal "1" appears on the word line 243w.

The above description is concerned with an example of the match block 243 in which data is defined by the connecting condition of the signal line to the gate of the serially connected enhancement type transistor 264. According to the above-described scheme, however, there is such a possibility that the contact pattern of the gate is visible, and thus the match data may be interpreted through a disassembly investigation of an LSI. In view of this problem, there is proposed another circuit scheme, as shown in FIG. 10B, according to which it is possible to almost completely prevent the match data from being interpreted through a visual observation.

In the circuit shown in FIG. 10B, a basic transistor arrangement is different from FIG. 10A. As seen from FIG. 10B, the basic transistor arrangement comprises a transistor pair 266 of an enhancement type transistor 266a and a depletion type transistor 266b, which are connected to the positive logical line 268a and the negative logical line 268b, respectively.

It is completely impossible in appearance to discriminate between the enhancement type transistor 266a and the depletion type transistor 266b, because the difference between both the transistors resides in only a difference in threshold voltage due to a difference in density of the impurity or the like just below their gate.

Regarding the operation of the transistor pair 266, to yield a match with the input signal "1", there is provided such an arrangement that the enhancement type transistor is connected to the positive logical line 268a, and the depletion type transistor is connected to the negative logical line 268b. According to such an arrangement, when the binary signal "1" is inputted to the input signal line 268, the binary signals "1" and "0" are applied to the positive logical line 268a and the negative logical line 268b, respectively. At that time, the enhancement type transistor 266a turns on upon receipt of the binary signal "1" at its gate. On the other hand, the depletion type transistor 266b turns on regardless of the binary signals "1" and "0" to be applied to its gate, since its threshold voltage is negative. Thus, the transistor pair 266 turns on to yield the match.

Oppositely, when the binary signal "0" is inputted to the input signal line 268, the binary signal "0" appears positive logical line 268a, so that the enhancement type transistor 266a turns off. Thus, the transistor pair 266 turns off to yield the mismatch.

In this manner, it is possible to define the data through selection as to which one of two transistors of the transistor pair 266 is selected as the enhancement type transistor 266a so that the match or mismatch with the data is detected. In the circuits shown in FIG. 10B, these transistor pairs are connected in series to constitute the dynamic NAND circuit.

If the both transistors of the transistor pair 266 are of a depletion type, the transistor pair turns on regardless of the states of the input data, and thus it is possible to define a so-called don't care state.

Figure 11:
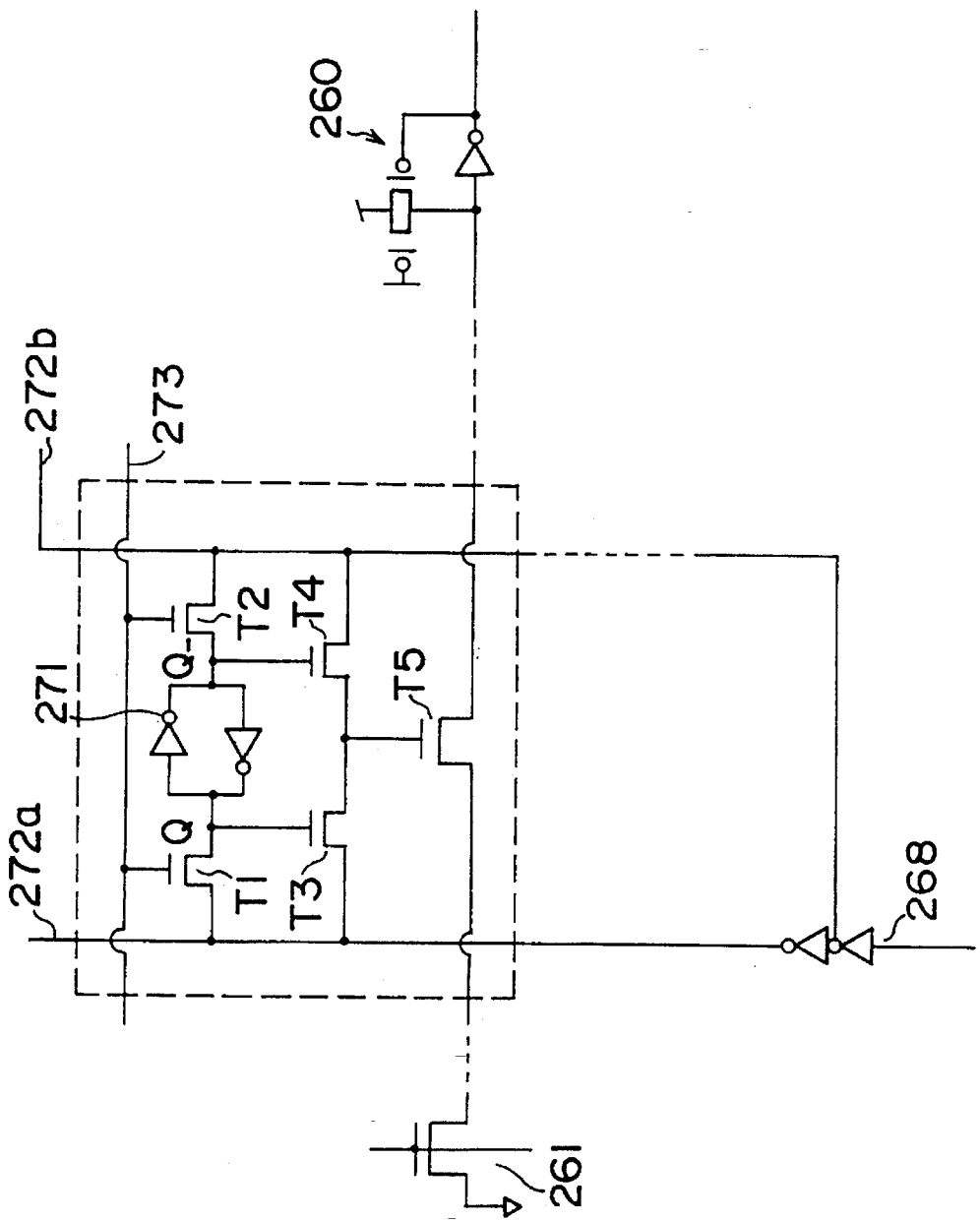
FIG. 11 is a circuit diagram embodying a match block of a match detection unit of the data flow control apparatus shown in FIG. 8, in which an SRAM is used.

According to the present embodiment, while values of the data have been made up beforehand in manufacturing process, it is not necessarily so. It is acceptable to use an SRAM, an EPROM, an EEPROM and the like which are reloadable for data. FIG. 11 is a circuit diagram embodying a match block of a match detection unit of the data flow control apparatus shown in FIG. 8, in which an SRAM is used. In FIG. 11, to simplify the structure, there is exemplarily shown an arrangement in which only a part corresponding to the enhancement type transistor 264 as a basic element in FIG. 10A is replaced by the SRAM. This part is encircled with the dotted line.

Internal nodes Q and Q_ of the usual SRAM 271 are connected to transistors T3 and T4, respectively. A transistor T5 is connected between both the transistors T3 and T4 which are connected in series. The positive logical signal and the negative logical signal of the input signal line 268 are a bit line 272a and a bit bar line 272b, respectively.

It is assumed that the SRAM 271 holds data "1", that is, Q="1", Q_=0. If the input signal "1" is entered, and matches the data held in the SRAM 271, the transistor T3 turns on, since Q="1". As a result, the positive logical signal "1" is applied to a gate electrode of the transistor T5. Thus, the transistor T5 turns on. A plurality of such transistors T5 are connected in series to constitute the dynamic NAND circuit. Consequently, when the data of all SRAM's match the input signal, a match output "1" is derived from the dynamic sense amplifier 260.

If the input signal "0" is entered, and the data of the SRAM 271 is "0", likewise, the negative logical signal "0" is applied to the gate electrode of the transistor T5 through the transistor T4 which turns on (at Q_="1").

In a case where the input signal does not match the data held in the SRAM 271, for example, the input signal is "1" and the data held in the SRAM 271 is "0" (Q="0", Q_="1"), the negative logical signal "0" is applied to the gate electrode of the transistor T5 through the transistor T4 which turns on (at Q_="1"), so that the transistor T5 turns off. The reverse is also the same.

Incidentally, during detection of the match or mismatch, the word line 273 of the SRAM 271 maintains the "0" state. When data is written into the SRAM 271, the usual memory operation is performed, for example, in such a way that the word line 273 is given with the "1" state.

Figure 12A:
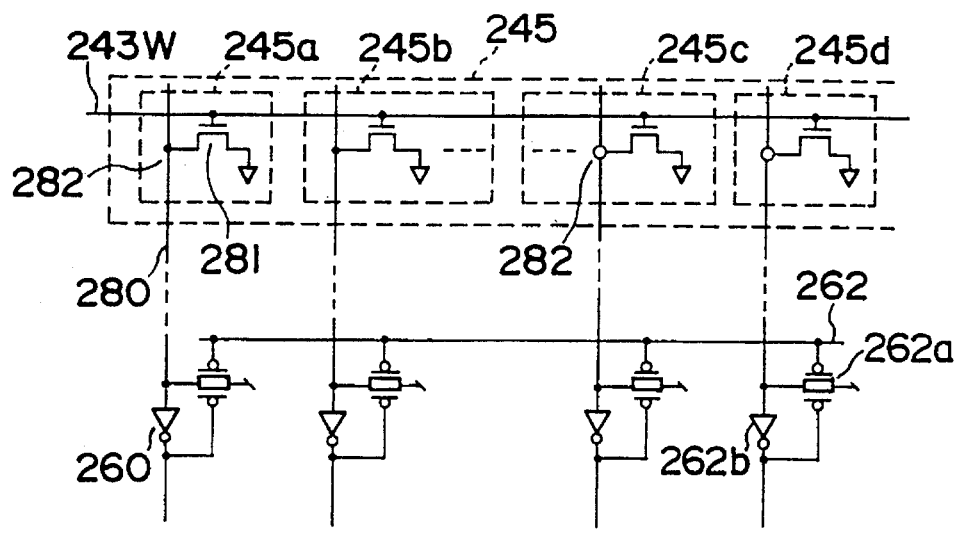
FIGS. 12A and 12B are each a circuit diagram embodying a memory block of a memory unit of the data flow control apparatus shown in FIG. 8.
Figure 12B:
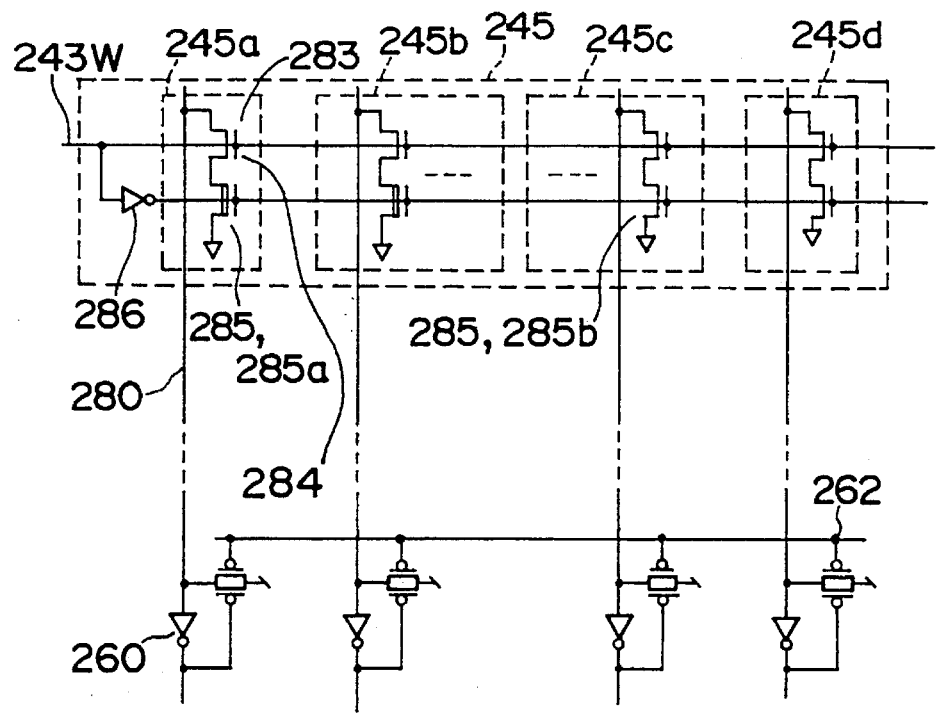

FIGS. 12A and 12B are each a circuit diagram embodying a memory block of a memory unit of the data flow control apparatus shown in FIG. 8. FIGS. 12A shows an example in which the enhancement type memory transistors are used. FIGS. 12B shows another example in which a pair transistor including a depletion type memory transistor 285a is used.

In FIG. 12A, the respective gate electrodes of a plurality of enhancement type memory transistors 281 are connected to a common word line 243w on each memory block 245, and those elements constitute a feedback register control flag 245a, a feedback data 245b, an output data 245c and a selector control flag 245d.

Each enhancement type memory transistor 281 represents the binary values "1" and "0" depending on whether or not the connecting section 282 is coupled to the bit line 280, where the black dot in the connecting section 282 indicates a connecting state, and the white dot indicates a non-connecting state. The bit line 280 is connected to the dynamic sense amplifier 260. First, the binary signal "0" appears on a control signal line 262, and then the respective bit lines 280 are pre-charged by the associated pre-charge transistors 262a. Whereas the word line 243w is set to "0". Next, when the binary signal "1" appears on the control signal line 262, and then the binary signal "1" appears on the word line 243w, the respective enhancement type memory transistors 281 turn on. As a result, an electric charge on the bit line, which is in the connection state in the connecting section 282, is discharged through the enhancement type memory transistor 281. This is detected by the dynamic sense amplifier 260 to output the binary signal "1". Oppositely, the dynamic sense amplifier 260 involved in the bit line 280, which is in the non-connection state in the connecting section 282, outputs the binary signal "0", since the electric charge on the bitline 280 is maintained.

Also in this case, it is usual that the connecting section 282 is formed with a pattern, which will retains the shape of the contact and the like. Thus, there is still a possibility that the data analysis is conducted through the disassembly investigation. In view of this problem, there is proposed another circuit scheme with a memory definition, as shown in FIG. 12B, which remains no variations in shape, and according to which memory definition a threshold voltage is varied by means of varying an amount of injection of ions or changing impurities to be injected.

As seen from FIG. 12B, a basic memory 283 comprises two transistors of a select transistor 284 and a memory transistor 285 which are connected in series. With respect to the memory transistor 285, there are two sorts of an enhancement type transistor 285b and a depletion type transistor 285a, which correspond to the data "0"' and "1", respectively.

When the signal "1" appears on the word line 243w, all select transistors 284 turn on. Whereas the memory transistors 285, to which the output "0" of the inverter 286 connected to the word line 243w is applied, are separated to two types of enhancement type transistor and depletion type transistor to turn off and on, respectively. Specifically, in case of the depletion type transistor 285a, an electric charge beforehand pre-charged on the bit line 280 is discharged, so that a binary signal "1" is outputted through the dynamic sense amplifier 260. On the other hand, in case of the enhancement type transistor, the electric charge on the bit line 280 are maintained, so that a binary signal "0" is outputted through the dynamic sense amplifier 260. However, these different type of transistors are in appearance completely the same as each other. Thus, it is very difficult to discriminate those elements through the disassembly investigation.

It is, of course, acceptable that the above-described circuit schemes according to the embodiment may be replaced by the known circuit schemes. Also with respect to the process, it is not restricted to the ROM, and an SRAM, a flash ROM, an EPROM, an EEPROM and the like as well.

Further, according to the present embodiment, the data flow control apparatus 10 is arranged independently of the ROM 4. However, it is acceptable to incorporate the data flow control apparatus 10 into the memory apparatus such as a ROM and the like.

Next, the third embodiment of the data flow control apparatus 10 will be described.

Figure 13B:
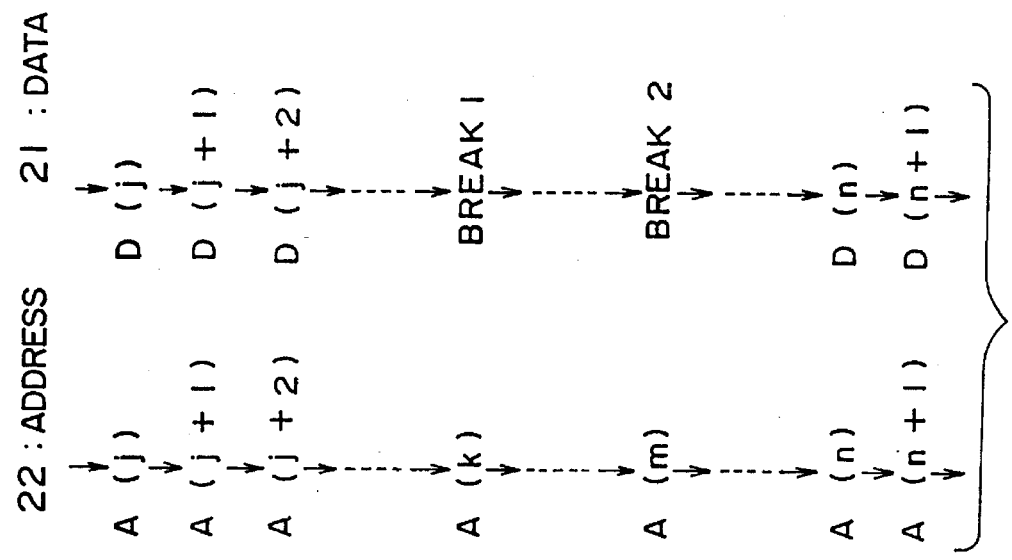
FIGS. 13A and 13B are each a flowchart of a data output to an address input.
Figure 13A:
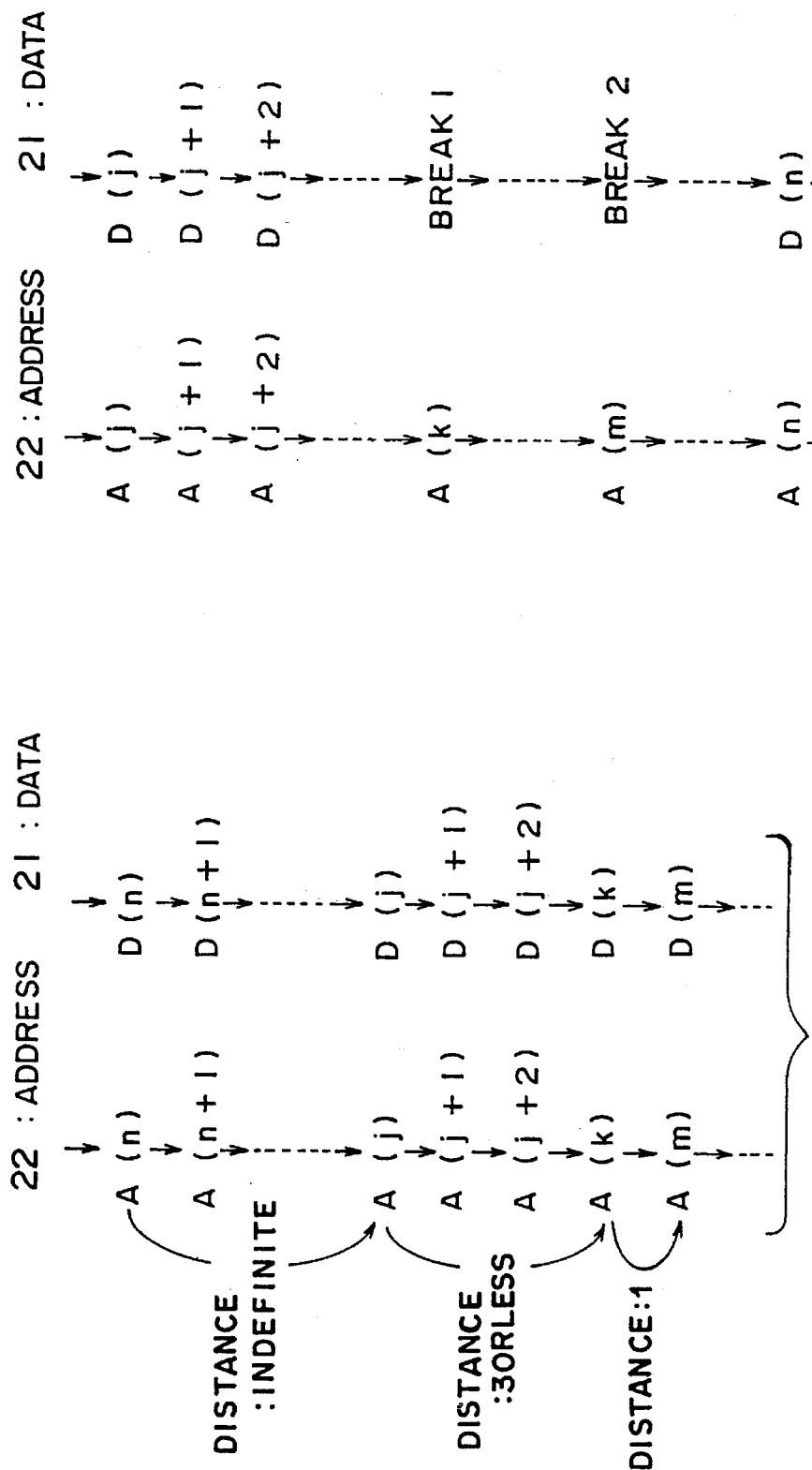

It is assumed that as shown in FIG. 6 the ROM 4 stores in addresses A the associated data D, respectively, and as shown in FIG. 13A the address data are sequentially inputted, under normal operation of the software, in the order of A (n)→A (n+1)→ . . . →A (j)→A (j+1)→A (j+2)→A (k)→A (m). Here, the following two arrays are noticed. That is, the first array is concerned with {A (n), A (j), A (k)} which is formed through thinning the full sequence of the address data in the named order, and the second array is concerned with {A (n), A (j), A (k), A (m)} which is formed through adding the address data A (m) to the first array. In addition, there is noticed a distance between the address data which constitute the arrays. The "distance" denotes an index indicating that when a certain address data of interest is inputted and thereafter another address data of interest is inputted, how many address data are inputted between those two address data of interest. It is assumed that the distance from an entry of the address data A (n) of interest to an entry of the subsequent address data A(J) of interest is indefinite. This means that it is permissible either to input the address data A (j) immediately after the entry of the address data A (n) or to input the address data A (j) after indefinite number of address data are inputted since the entry of the address data A (n). With respect to the address data A (j) and the address data A (k), the distance therebetween is given with 3, which represents that it is permissible that maximum two other address data enter between the address data A (j) and the address data A (k). Regarding the address data A (k) and the address data A (m), the distance therebetween is given with 1, which represents that it is inhibited that any other address data enters between the address data A (k) and the address data A (m).

There is provided in advance such a definition that the proper data D(k) and D(m), which are stored in the data flow control apparatus 10, are outputted in response to the address data A (k) and A(m), respectively, when the sequences of the above-noted arrays and the respective distances between the address data are satisfied. On the other hand, in the ROM 4 'BREAK 1' and 'BREAK 2', which cause the system down, are defined in advance for the addresses A (k) and A(m), respectively.

A processing procedure for addresses during an operation of the control system and the output data, according to such a software, are provided as shown in FIG. 13A. Specifically, for the address data other than the address data A (k) and A (m), the associated data stored in the ROM 4 are outputted, respectively. However, when the address data A (k) and A (m) are inputted, the data 'BREAK 1' and 'BREAK 2', which cause the system down, are inhibited from being outputted from the ROM 4. Instead the data D (k) and D (m) are outputted. Thus, the normal operation is continued. On the other hand, in a case where an unfair copy practice for data is conducted, the addresses are simply sequentially inputted, without analysis of the actual processing procedure of the software or the flow of the addresses, so as to read the data outputted corresponding to the inputted addresses. In this case, the output data corresponding to the respective addresses are provided as shown in FIG. 13B. Thus, it is simply possible to obtain only 'BREAK 1' and 'BREAK 2' as the data corresponding to the addresses A (k) and A (m). As a result, if the software is operated with such a data, this causes a system down at a certain time point.

In this manner, according the third embodiment of the present invention as well as the second embodiment, there are noticed two points one of which is concerned with a discontinuity of the address which will exist in actual operation of the software, and the other a relevancy of the addresses such that data from a plurality of addresses are needed for a series of processing. From this point of view, an output data related to a specific address is associated with not only an up-to-dately inputted address data but also before inputted address data, and a combination of such a plurality of address data is defined as a key data. The data flow control apparatus 10 beforehand stores data corresponding to the key data. Whereas the usual ROM 4 beforehand stores a dummy data, for example, the 'BREAK 1' and 'BREAK 2' which cause a system down, as mentioned above. This makes it difficult for the third person to identify the dummy data and the key data.

According to the present embodiment, as the key data of D (k), a sequence of three address data A (n), A (j) and A (k) associated with itself is defined, as the key data of D (m), a sequence of four address data A (n), A (j), A (k) and A (m) associated with itself is defined, and the respective distances (including "indefinite") between the address data are defined. The output of the proper data D (k) and D (m) is only permissible, when these three or four address data are inputted in the named order with the given distances. However, the arrays of address data are not restricted to the above-mentioned arrays of three or four address data by way of example, and it is possible to optionally select a desired number of addresses and/or a desired location of addresses from among a plurality of addresses to be accesses for a series of processings, so that dummy data are stored in the ROM 4 while the proper data and the associated key data are stored in the data flow control apparatus 10. Also with respect to the distances of the address, they are not restricted to the embodied ones. Further, it is acceptable to vary the number of address data to form a definition of the key data, and/or to increase the number of data to be replaced by means of increasing the number of key data. These modifications make it more difficult to conduct the illegal copy.

The data flow control apparatus 10 according to the third embodiment of the present invention will be described in detail referring to FIGS. 14 and 15.

Address data are inputted via the address line 7 to a match detection unit 341, while data stored in a feedback register 342 is inputted to the match detection unit 341. Thus, activated is a word line 343w of a match block 343 of which a content matches both the data stored in the feedback register 342 and the entered address data. As a result, the associated memory block 345 is selected.

Each of the memory blocks 345 comprises a counter set flag 345a, a counter enabling flag 345b, a feedback data 345c, a counter data 345d, an output data 345e and a selector control flag 345f. The match blocks 343 each comprise an address data match section 343a and a feedback data match section 343b.

First, the address data A (n) is inputted to the match detection unit 341 in which data A (n) is stored in the address data match section 343a of the fourth match block 343. The feedback data match section 343b of the fourth match block 343 is set up to be a "don't care" state in which it is considered that a match is available for any data. As a result, there occurs a match on the fourth match block 343, so that the word line 343w is activated to select the fourth memory block 345 whereby the storage data are read out. Since the selector control flag 345f of the storage data is given with the binary value "0", the selector 346 permits the output signal passed via the data input line 247 from the ROM4 to be outputted to the data line 8.

Since the counter set flag 345a is also given with the binary number "1", the number '1', which is read out from the feedback data 345c in timing of the rise-up (time T1 in FIG. 15) of a feedback register control signal, is stored in the feedback register 342. Whereas an asterisk "*" of the counter data 345d is inputted to the counter 352 in timing of the rise-up of a count set signal which is derived through delaying the counter set flag 345a by Δt2. The asterisk "*" of the counter data 345d implies that any value is acceptable. The reason why any value is acceptable is that the counter enabling flag 345b is given with the binary signal "0" and as a result an output signal to the feedback register 342 becomes the binary signal "1" regardless of the state of the counter 352. Thus, it is possible to maintain the value of the feedback register 342, until the subsequent address data A (j), constituting the above-mentioned array, is inputted. As a result, it is indefinite as to the distance between the key addresses A (n) and A(j).

Specifically, the feedback register 342 and the counter 352 will be explained referring to FIG. 16. The feedback register 342 comprises a plurality of flip-flops 390 and a plurality of input data control circuits 391. An output Q of the flip-flop 390 is fed back to the input data control circuit 391. The control circuit 391 receives two main inputs.

One of the main inputs is concerned with the feedback data 345c which is applied to the feedback register 342 in timing (times T1, T2, T3, T4, etc. in FIG. 15) of the rise-up of the feedback register control signal, when the counter set flag 345a is "1", or an output of the counter 352, namely, an output of an OR circuit 395 is "0".

The other is concerned with a feedback data from the flip-flop 390, which feedback data is fed back, in a similar fashion to the above, in timing of the rise-up of the feedback register control signal, when the counter set flag 345a is "0", or the output of the counter 352 is "1", so as to be held as it is.

Figure 14:
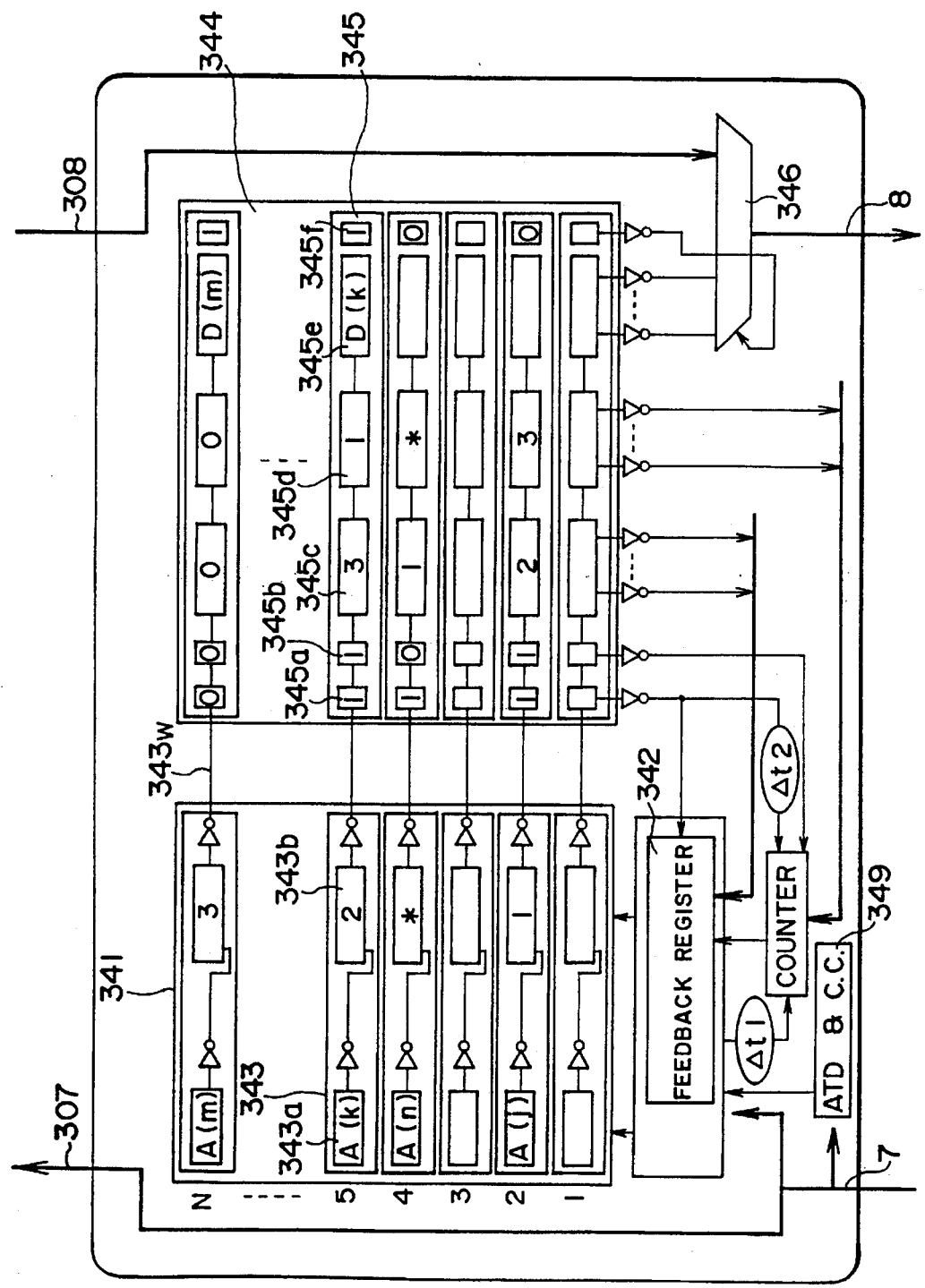
FIG. 14 is a schematic circuit diagram of a data flow control apparatus according to the third embodiment of the present invention.

The feedback register control signal is outputted from the control circuit 349 in FIG. 14 through an output of the ATD for detecting variations of the addresses entered via the address line 7. This signal is delayed by Δt1 and reversed to form the control signal (refer to FIG. 15).

With respect to the counter 352, a value of the counter data 345d is inputted to the counter circuit 392 in timing of the rise-up of the counter set signal which is formed through delaying the counter set flag 345a (FIG. 14) by Δt2. The counter circuit 392 receives the control signal at the countdown terminal, and counts down one by one whenever the address data is inputted.

an OR circuit 393 performs an OR operation for outputs of the counter circuit 392 and transmits its output signal to an OR circuit 395. The OR circuit 395 also receives an output of a flip-flop 394 to which the inversion of the counter enabling flag 345b by an inverter 394a is inputted. The flip-flop 394 also receives the counter enabling flag 345b in timing of the rise-up of the counter set signal. When the flip-flop 394 outputs the binary number "0", that is, the counter is disenable, the OR circuit 395 outputs the binary signal "1" to the feedback register 342. As a result, if the counter set flag 345a is not "1", the output Q of the flip-flop 390 is circulatingly held.

When the counter enabling flag 345b is "1" and thus the counter 352 is enable (the output of the flip-flop 394 is the binary number "0"), the output of the OR circuit 395 is "1", if either of the outputs of the counter circuit 392 is "1". Thus, in a similar fashion as above, the output Q of the flip-flop 390 is circulatingly held.

As will be understood from the above description concerning the feedback register 342 and the counter 352, if the counter enabling flag "0" is once taken, the feedback register 342 holds the same value regardless of the countdown operation of the counter 352, until the address data A (j), which is expected to be subsequently entered, is inputted.

Next, there will be explained a case where the address data (j) is inputted.

When the address data (j) is inputted, the feedback register 342 has already received and maintained the binary signal "1". Thus, in the similar fashion as described above, there occurs the match in the second match block in FIG. 14. Thus, a word line 343w of a match block 343 is activated. As a result, the associated memory block 345 is selected to output the binary value "1" of the counter set flag 345a, the binary value "1" of the counter enabling flag 345b, the number '2' of the feedback data 345c and the number '3' of the counter data 345d. Whereas the selector control flag 345f is the binary value "0", and thus there is still outputted through data line 8 the output data which is supplied from the ROM 4 via data line 308a to the selector 346.

Now, the counter set signal, which is made up on the basis of the counter set flag 345a, becomes the binary value "1", and thus the number '2' of the feedback data 345c is inputted to the feedback register 342 in timing (T2 in FIG. 15) of the rise-up of the feedback register control signal. In addition, the number '3' of the counter data 345d is inputted to the counter 352. Since the counter enabling flag 345b is of the binary value "1", the output of the flip-flop 394 in FIG. 16 becomes the binary value "0", so that the feedback register 342 is controlled alternatively in accordance with the signal from the counter circuit 392.

Figure 15:
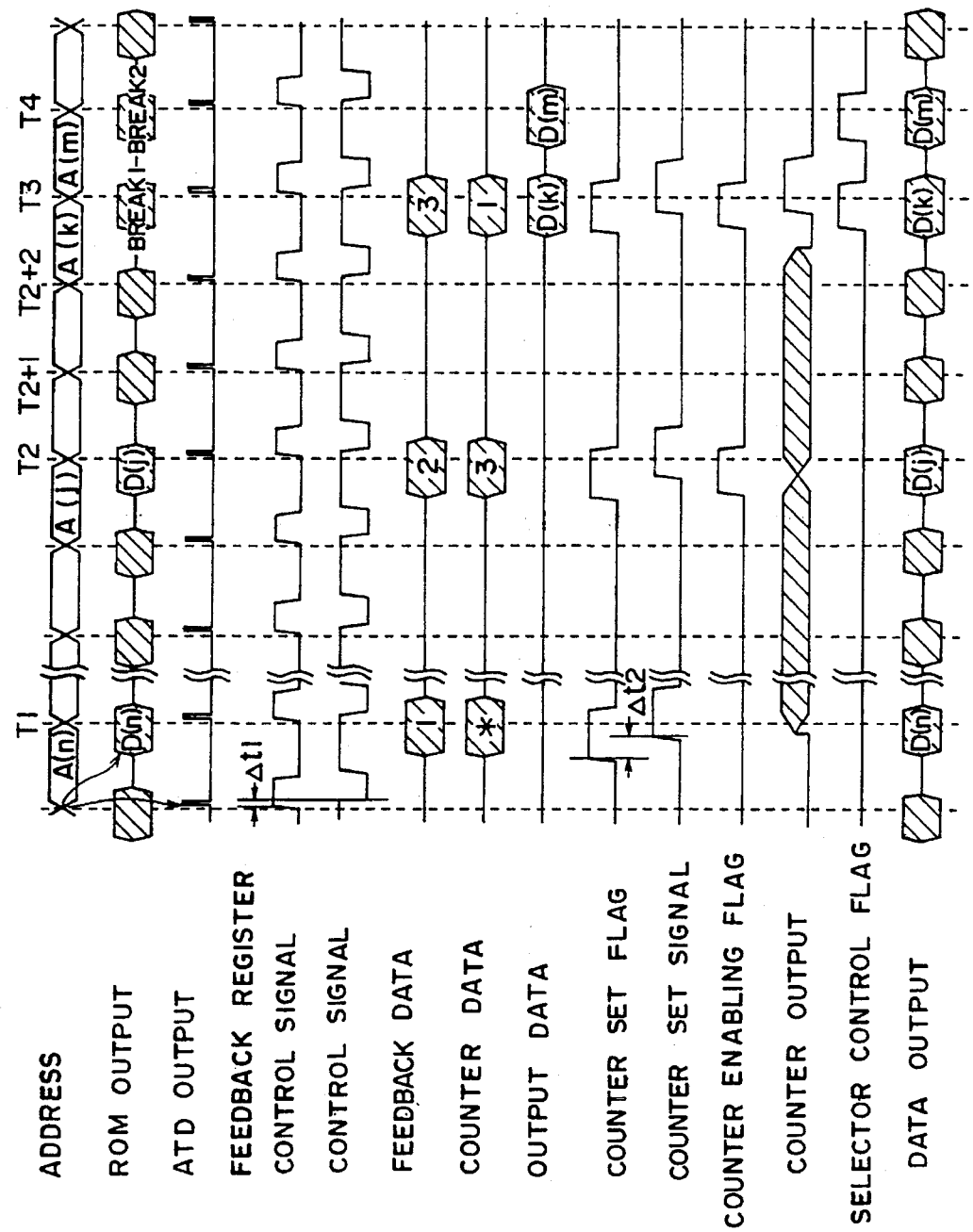
FIG. 15 is a time chart useful for understanding the data flow control apparatus shown in FIG. 14.

When the subsequent address data is entered, the counter 352 (FIGS. 14, 15 and 16) is counted down in the count value by one in timing of the rise-up of the control signal, so that the count value becomes '2' (between times T2 and T2+1 in FIG. 15).

Further, when the subsequent address data is inputted, the feedback register control signal rises up. However, since the counter set flag 345a is given with the binary value "0" and the output from the counter 352 is the binary value "1", the output of the flip-flops 390 of the feedback register 342 is fed back as it is, so that the previous data is retained (refer to FIG. 16). The counter 352 is counted down to the number '1' in timing of the rise-up of the control signal between times T2+1 and T2+2.

At the time T2+2, likewise, the feedback register control signal rises up. However, also at that time, the value of the counter 352 is the number '1' and the counter set flag 345a is given with the binary value "0". Thus, the previous data is still retained. Next, the counter 352 is counted down to the number '0', so that the output '0' of the counter 352 is supplied to the feedback register 342. Whereas the address data in time has become the expected A (k). Thus, the counter data 345d "1" and the counter enabling flag 345b "1" are set up in timing of the rise-up of the counter set signal. At that time, since the selector control flag 345f is of the binary "1", D(k) of the output data 345e is outputted, instead of the output data BREAK 1 from the ROM 4, through the selector 346 via the data line 8. The number '3' of the feedback data 345c is inputted and held in the feedback register 342 in timing of the rise-up of the feedback register control signal at time T3.

The counter 352 is counted down to the number '0' in timing of the rise-up of the feedback register control signal between times T3 and T4. At that time, since the selector control flag 345f is of the binary "1", D(m) of the output data 345e is outputted, instead of the output data BREAK 2 from the ROM 4, from the data flow control apparatus 10 through the selector 346 via the data line 8.

Next, the number '0' of the feedback data 345c is inputted and held in the feedback register 342 in timing of the rise-up of the feedback register control signal at time T4, since the output from the counter 352 is of the binary value "0".

The counter 352 and the flip-flop 394 of the counter enabling flag 345b maintain the state of the binary value "0", since the counter set flag 345a is of the binary value "0".

As described above regarding the operation, what determines the distance n (integer) of two expected input address data is the counter 352. It is noted, however, that a circuit for controlling an entry of the feedback data 345c, which constitutes the input data control circuit 391 of the feedback register 342, is constructed of the OR circuit 391b for performing the OR operation for the output of the counter 352 and the counter set flag 345a. Consequently, even if the expected address data is inputted before the n-th, it may be considered to be equivalent to the fact that the expected address data is inputted just the n-th. Reversely, in a case where the expected address data is inputted after the n-th, the feedback data, after the output of the counter 352 becomes "0", which is involved in no presence of the expected address data, that is, the number '0' enters the feedback register 342.

In this manner, according to the present embodiment, the output data is not determined by only the current address entered, but for a specified address the output of data is determined by an address sequence in the execution of a software before entered, and the distance as well. Thus, it is rendered possible to prevent an unfair copy practice from being conducted.

Further, according to the present embodiment, there is so arranged that even unexpected any single or plural address data follow, for example, the address data A (n), as shown by way of example, the subsequent address data as a key data is always monitored. Consequently, also for the advanced reading of data by successive addresses taking no account of a processing procedure of a software in a prefetch operation of a CPU for a higher speed processing, it is possible to implement an extraction of suitable key data and an output of proper data, without malfunction.

It is noted that the match block 343 of the match detection unit 341 and the memory block 345 of the memory unit 344 shown in FIG. 14, which relate to the third embodiment, are not restricted to the embodied circuits shown by way of example. It is acceptable, for example, to arrange those in a similar fashion as the embodied circuit structure shown in connection with the second embodiment (refer to FIGS. 10A and 10B, FIG. 11, and FIGS. 12A and 12B).

Next, the fourth embodiment of the data flow control apparatus 10 will be described.

Figure 19:
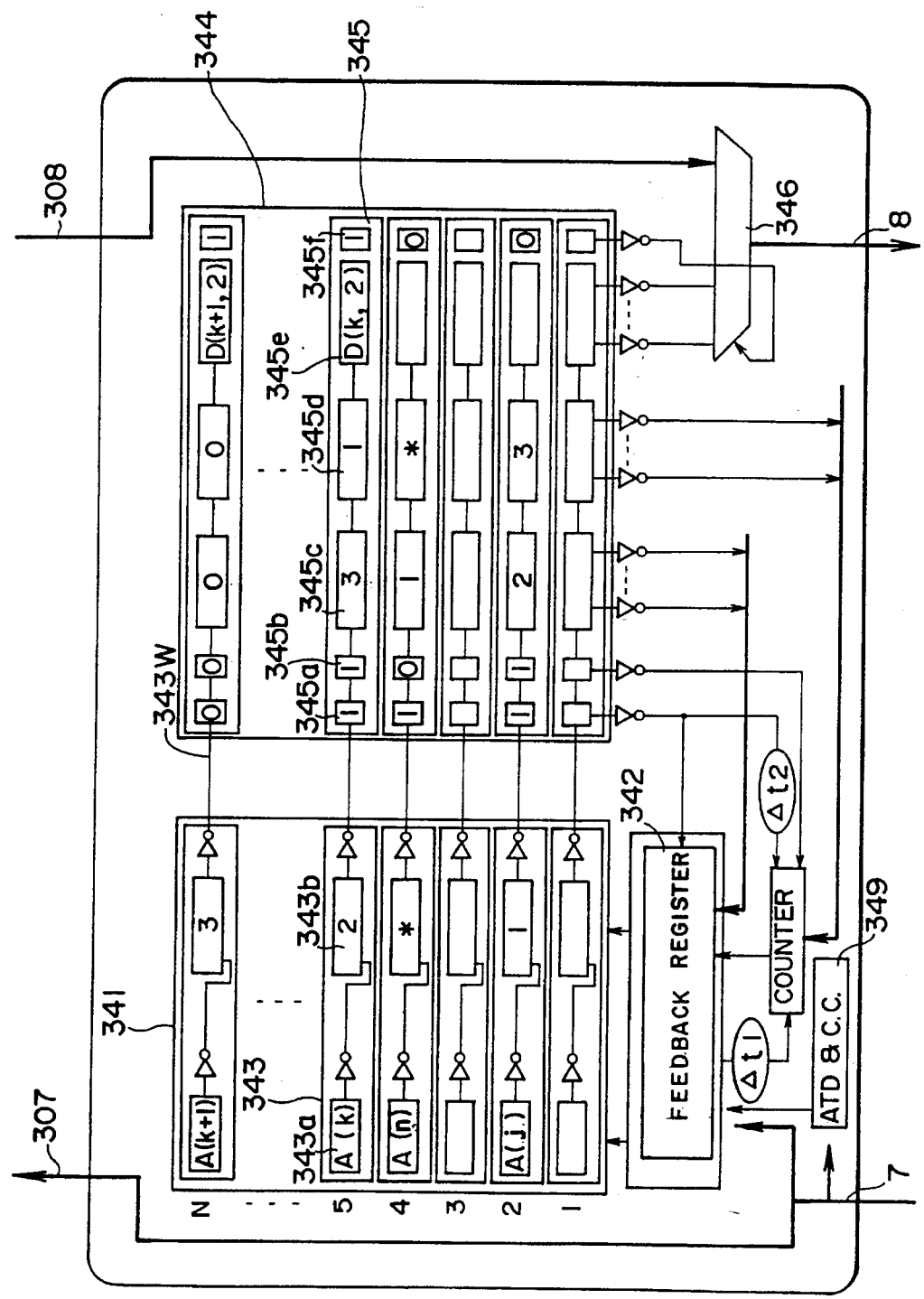
FIG. 19 is a schematic circuit diagram of a data flow control apparatus according to the fourth embodiment of the present invention.

It is assumed that as shown in FIG. 17A the ROM 4 stores in addresses A the associated data D, respectively, and as shown in FIG. 17B the data flow control apparatus 10 stores in addresses A the associated data D. As shown in FIG. 19, the ROM 4 receives address data via the data line 7 through the data flow control apparatus 10. Output data from the ROM 4 are outputted through the data flow control apparatus 10 to the data line 8. It is acceptable to directly connect to the ROM 4 the whole or a part of the address line 7, or a part of the data line 8.

Next, there will be explained an example of operation in execution of a software.

Specifically, the present embodiment will be described from such a view point that a plurality of data are associated with a single address, a so-called "multiplexing of address".

In processing of a certain software, it is assumed that addresses are accessed in the order of A (j)→A (j+2)→A (k)→A (k+1). This procedure is shown in FIG. 18A in which the sequence numbers (1) to (4) are added. In this case, there are outputted the associated data from the usual ROM 4.

It is assumed that data of the address A (j) corresponds to a evaluation part for a conditional jump, and the above-mentioned first case implies that no jump occurs.

Figure 18B:
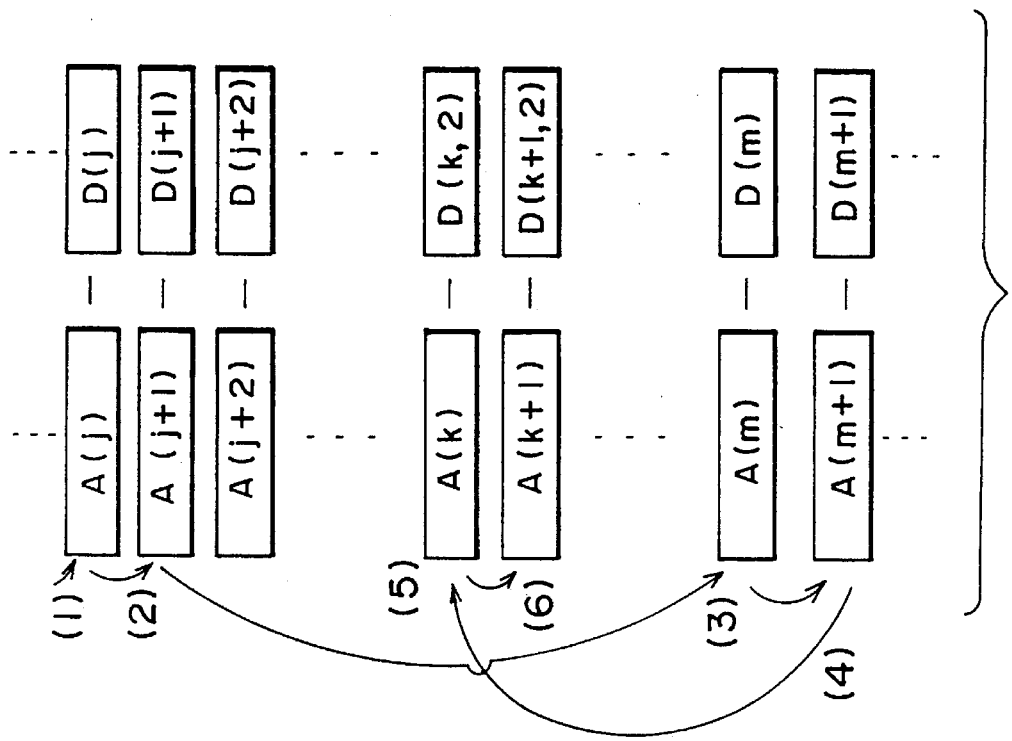
FIGS. 18A and 18B are each a flowchart of a data output to an address input.
Figure 18A:
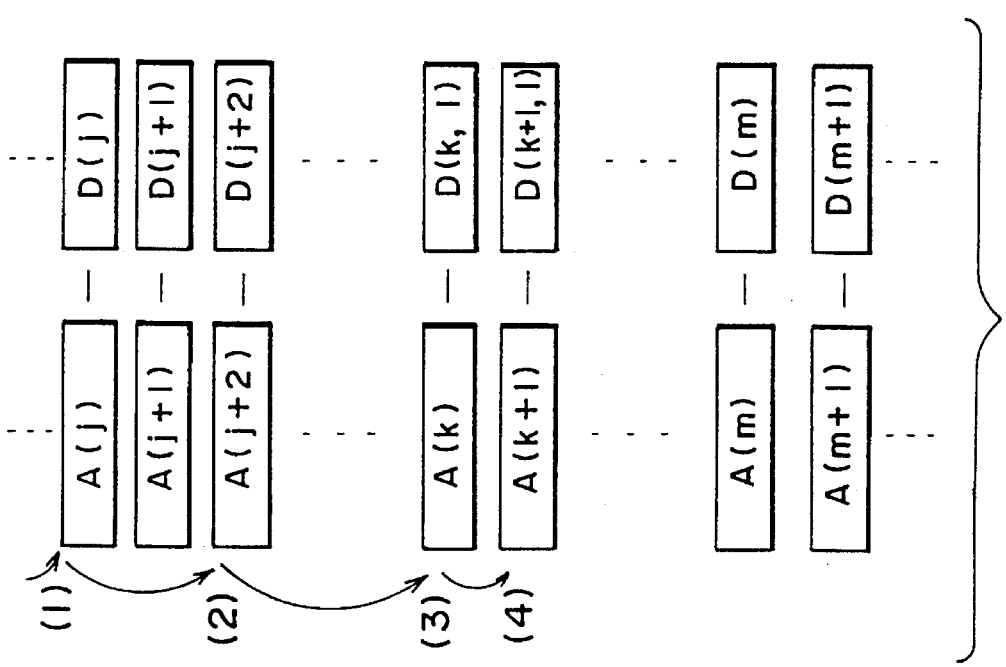

On the other hand, FIG. 18B shows the second case in which a conditional jump occurs, and a sequence of the address access is given in the order of A (j)→A (j+1)→A (m)→A (m+1)→A (k)→A (k+1).

In the first case (FIG. 18A), the addresses A (k) and A (k+1) are associated with data D (k, 1) and data D (k+1, 1). On the other hand, in the second case (FIG. 18B), the same addresses A (k) and A (k+1) are associated with data D (k, 2) and data (k+1, 2), respectively, which are different from that in the first case. Hence, the data D (k, 2) and data (k+1, 2) associated with the addresses A (k) and A (k+1) in case of the second case are stored in advance in the data flow control apparatus 10. Under this situation, if the access is effected in accordance with a sequence in the second case, that is, in the order of A (j)→A (j+1)→A (m)→A (m+1)→A (k)→A (k+1), the data stored in the data flow control apparatus 10, but not the ROM 4, are outputted in compliance with the addresses A (k) and A (k+1).

Here, among the addresses in the second case, specifically, the order of occurrence of the addresses {A(j), A (m), A (k), A (k+1)} is noticed. In addition, there is noticed a distance between the address data. The "distance" denotes an index indicating that when a certain address data of interest is inputted and thereafter another address data of interest is inputted, how many address data are inputted between those two address data of interest. It is assumed that the distance from an entry of the address data A (j) of interest to an entry of the subsequent address data A(m) of interest is indefinite. This means that it is permissible either to input the address data A (m) immediately after the entry of the address data A (j) or to input the address data A (m) after indefinite number of address data are inputted since the entry of the address data A (j). With respect to the address data A (m) and the address data A (k), the distance therebetween is given with 3, which represents that it is permissible that maximum two other address data enter between the address data A (m) and the address data A (k). Regarding the address data A (k) and the address data A (k+1), the distance therebetween is given with 1, which represents that it is inhibited that any other address data enters between the address data A (k) and the address data A (k+1).

There is provided in advance such a definition that the proper data D(k, 2) and D(k+1, 2), which are stored in the data flow control apparatus 10, are outputted in response to the address data A (k) and A(k+1), respectively, when the sequences of the above-noted arrays and the respective distances between the address data are satisfied. On the other hand, in the ROM 4 the branched program data D(k, 1) and D(k+1, 1) are defined in advance for the addresses A (k) and A(k+1), respectively.

In this manner, according the fourth embodiment of the present invention as well as the second and third embodiments, there are noticed two points one of which is concerned with a discontinuity of the address which will exist in actual operation of the software, and the other a relevancy of the addresses such that data from a plurality of addresses are necessary for a series of processing. From this point of view, an output data related to a specific address is associated with not only an up-to-dately inputted address data but also before inputted address data, and a combination of such a plurality of address data is defined as a key data. The data flow control apparatus 10 beforehand stores data corresponding to the key data. Whereas the usual ROM 4 beforehand stores data involved in other software-flow to provide a multiplexing address. This makes it difficult for the third party to identify the multiplexing address and the associated key data.

According to the present embodiment, as the key data of D (k, 2), a sequence of three address data A (j), A (m) and A (k) associated with itself is defined, as the key data of D (k+1, 2), a sequence of four address data A (j), A (m), A (k) and A (k+1) associated with itself is defined, and the respective distances (including "indefinite") between the address data are defined. The data D (k, 2) and D (k+1, 2) involved in the address-multiplexing are outputted corresponding to the A (k) and A (k+1), when these three or four address data are inputted in the named order with the given distances. However, the arrays of address data are not restricted to the above-mentioned arrays of three or four address data by way of example, and it is possible to optionally select a desired number of addresses and/or a desired location of addresses from among a plurality of addresses to be accessed for a series of processings, and also to conduct an address-multiplexing, so that data for a certain processing are stored in the ROM 4 while data for other processing and the associated key data are stored in the data flow control apparatus 10. Also with respect to the distances of the address, they are not restricted to the embodied ones. Further, it is acceptable to set a higher address-multiplexing factor, to vary the number of address data to form a definition of the key data, and/or to increase the number of multiplexing data by means of increasing the number of key data. These modifications make it more difficult to conduct the illegal copy.

As described above, the system according to the present invention may be arranged from a point of view of the address-multiplexing as described in connection with the fourth embodiment, as well as a point of view of the erroneous data, which causes a malfunction such as a system down if reading of data is not performed in accordance with a formal flow, as described in connection with the first to third embodiments.

Also in a case where the system according to the present invention is arranged from a point of view of the address-multiplexing, it is simply different in data which are stored in the ROM 4 and the data flow control apparatus 10, and thus it is acceptable, with regard to the hardware of the data flow control apparatus 10, to adopt the arrangements (FIGS. 4, 8 and 14) according to the first to third embodiments.

Next, from a point of view of address-multiplexing, there will be described an example of the circuit structure, referring to FIGS. 19 and 20, in connection with a case where between address data-to-address data which constitutes an array it is permitted to insert address data which constitutes the array, and in addition a concept of the "distance" is introduced between address data-to-address data which constitutes the array. It is noted that the circuit arrangement according to the present embodiment is duplicated in part to that (FIG. 14) of the third embodiment.

Referring to FIG. 19, address data are inputted via the address line 7 to a match detection unit 341, while data stored in a feedback register 342 is inputted to the match detection unit 341. Thus, activated is a word line 343w of a feedback block 343 of which a content matches both the data stored in the feedback register 342 and the entered address data. As a result, the associated memory block 345 is selected.

Each of the memory blocks 345 comprises a counter set flag 345a, a counter enabling flag 345b, a feedback data 345c, a counter data 345d, an output data 345e and a selector control flag 345f. The match blocks 343 each comprise an address data match section 343a and a feedback data match section 343b.

First, the address data A (j) is inputted to the match detection unit 341 in which data A (j) is stored in the address data match section 343a of the fourth match block 343. The feedback data match section 343b of the fourth match block 343 is set up to be a "don't care" state in which it is considered that a match is available for any data. As a result, there occurs a match on the fourth match block 343, so that the word line 343w is activated to select the fourth memory block 345 whereby the storage data are read out. Since the selector control flag 345f of the storage data is given with the binary value "0", the selector 346 permits the output signal passed via the data input line 247 from the ROM 4 to be outputted to the data line 8.

At that time, the number '1', which is read out from the feedback data 345c in timing of the rise-up (time T1 in FIG. 20) of a feedback register control signal, is stored in the feedback register 342. Whereas an asterisk "*" of the counter data 345d is inputted to the counter 352 in timing of the rise-up of a count set signal which is derived through delaying the counter set flag 345a by Δt2. The asterisk "*" of the counter data 345d implies that any value is acceptable. The reason why any value is acceptable is that the counter enabling flag 345b is given with the binary signal "0" and as a result an output signal to the feedback register 342 becomes the binary signal "1" regardless of the state of the counter 352. Thus, it is possible to maintain the value of the feedback register 342, until the subsequent address data A (m), constituting the above-mentioned array, is inputted. As a result, it is indefinite as to the distance between the key addresses A (j) and A(m).

Figure 16:
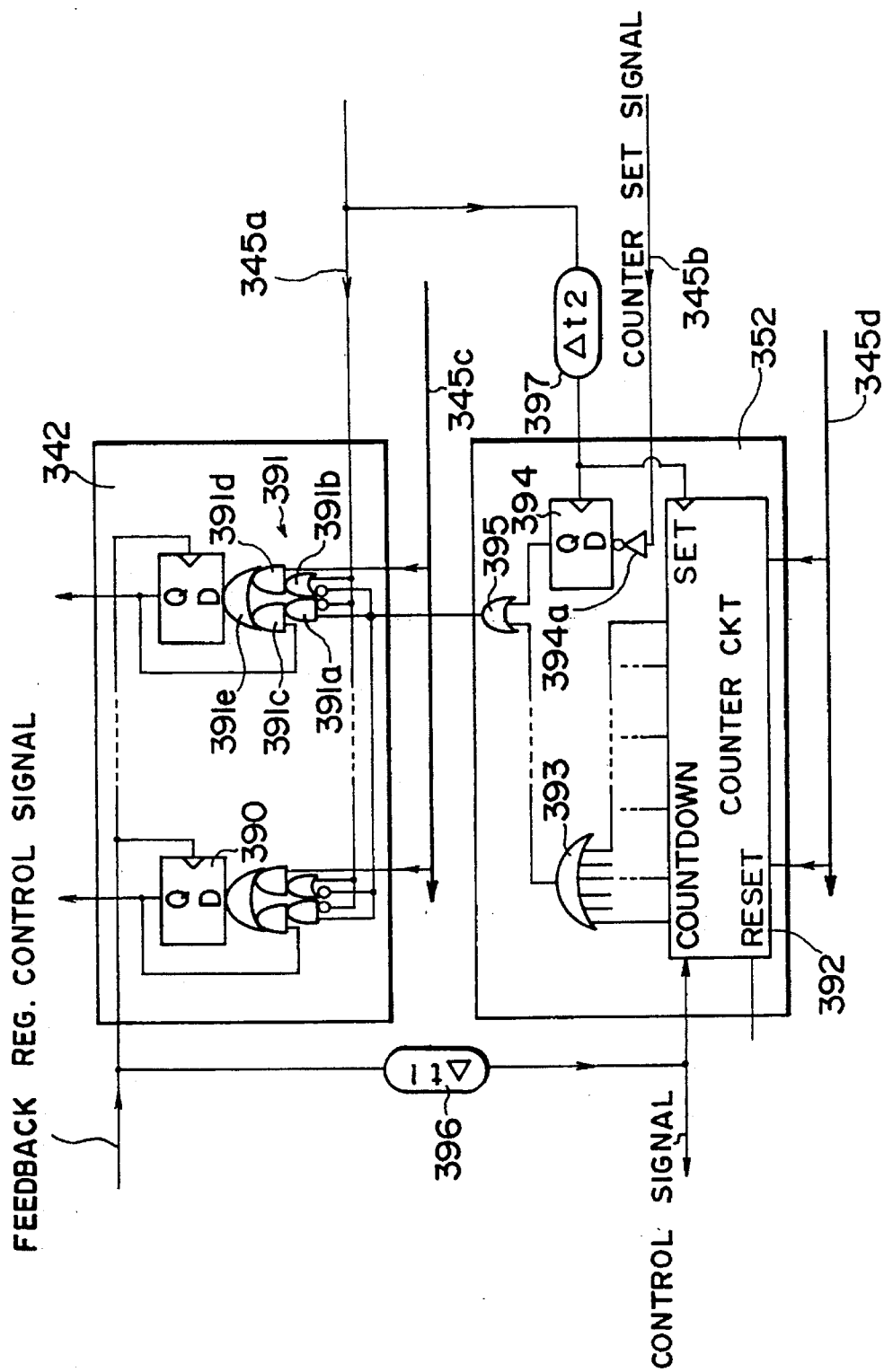
FIG. 16 is an illustration showing the basic arrangement of constituents of a feedback register and a counter of the data flow control apparatus shown in FIG. 14.

The feedback register 342 and the counter 352 are the same as those shown in FIG. 16. Thus, the explanation will be omitted.

Next, there will be explained a case where the address data (m) is inputted.

When the address data (m) is inputted, the feedback register 342 has already received and maintained the binary signal "1". Thus, in the similar fashion as described above, there occurs the match in the second match block in FIG. 19. Thus, a word line 343w of a match block 343 is activated. As a result, the associated memory block 345 is selected to output the binary value "1" of the counter set flag 345a, the binary value "1" of the counter enabling flag 345b, the number '2' of the feedback data 345c and the number '3' of the counter data 345d. Whereas the selector control flag 345f is the binary value "0", and thus there is still outputted through data line 8 the output data which is supplied from the ROM 4 via data line 308a to the selector 346.

Now, the counter set signal, which is made up on the basis of the counter set flag 345a, becomes the binary value "1", and thus the number '2' of the feedback data 345c is inputted to the feedback register 342 in timing (T2 in FIG. 20) of the rise-up of the feedback register control signal. In addition, the number '3' of the counter data 345d is inputted to the counter 352. Since the counter enabling flag 345b is of the binary value "1", the output of the flip-flop 394 in FIG. 16 becomes the binary value "0", so that the feedback register 342 is controlled alternatively in accordance with the signal from the counter circuit 392.

Figure 20:
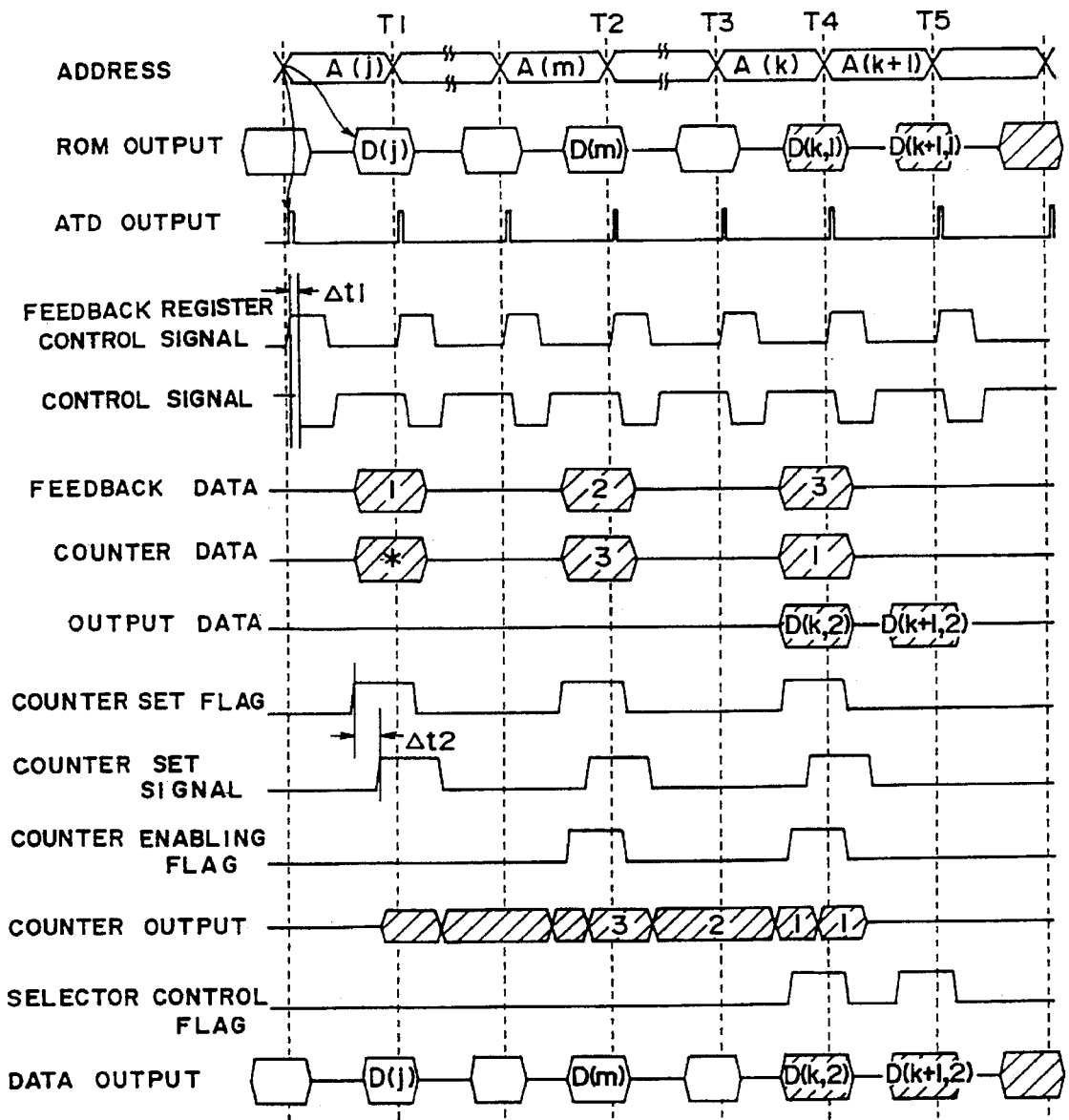
FIG. 20 is a time chart useful for understanding the data flow control apparatus shown in FIG. 19.

When the subsequent address data is entered, the counter 352 (FIGS. 19, 20 and 16) is counted down in the count value by one in timing of the rise-up of the control signal, so that the count value becomes '2' (between times T2 and T3 in FIG. 20). Further, when the subsequent address data is inputted, the feedback register control signal rises up. However, since the counter set flag 345a is given with the binary value "0" and the output from the counter 352 is the binary value "1", the output of the flip-flops 390 of the feedback register 342 is fed back as it is, so that the previous data is retained (refer to FIG. 16).

At the time T3, likewise, the feedback register control signal rises up. However, also at that time, the value of the counter 352 is the number '2' and the counter set flag 345a is given with the binary value "0". Thus, the previous data is still retained. Next, the counter 352 is counted down to the number '1', so that the output '1' of the counter 352 is supplied to the feedback register 342. Whereas the address data in time has become the expected A (k). Thus, in timing of the rise-up of the counter set signal, the counter data 345d "1" is set again to counter circuit 392, and the counter enabling flag 345b "1" is set to the flip-flop 394 through inversion. At that time, since the selector control flag 345f is of the binary "1", D(k, 2) of the output data 345e is outputted, instead of the output data D(k, 1) from the ROM 4, through the selector 346 via the data line 8. The number '3' of the feedback data 345c is inputted and held in the feedback register 342 in timing of the rise-up of the feedback register control signal at time T4.

When the address data A (k+1) is inputted, the counter circuit 352 is counted down to the number '0' in timing of the rise-up of the feedback register control signal between times T4 and T5, so that the content of the memory block 345, which is associated with the n-th match block 343, is read out. At that time, since the selector control flag 345f is of the binary "1", D(k+1, 2) of the output data 345e is outputted, instead of the output data D(k+1, 1) from the ROM 4, from the data flow control apparatus 10 through the selector 346 via the data line 8.

Next, the number '0' of the feedback data 345c is inputted and held in the feedback register 342 in timing of the rise-up of the feedback register control signal at time T5, since the output from the counter 352 is of the binary value "0".

The counter 352 and the flip-flop 394 of the counter enabling flag 345b maintain the state of the binary value "0", since the counter set flag 345a is of the binary value "0".

As described above regarding the operation, what determines the distance n (integer) of two expected input address data is the counter 352. It is noted, however, that a circuit for controlling an entry of the feedback data 345c, which constitutes the input data control circuit 391 of the feedback register 342, is constructed of the OR circuit 391b for performing the OR operation for the output of the counter 352 and the counter set flag 345a. Consequently, even if the expected address data is inputted before the n-th, it may be considered to be equivalent to the fact that the expected address data is inputted just the n-th. Reversely, in a case where the expected address data is inputted after the n-th, the feedback data, after the output of the counter 352 becomes "0", which is involved in no presence of the expected address data, that is, the number '0' enters the feedback register 342.

In this manner, according to the present embodiment, the output data is not determined by only the current address entered, but for a specified address the output of data is determined by an address sequence in the execution of a software before entered, and the distance as well. Thus, it is rendered possible to prevent an unfair copy practice from being conducted.

Further, according to the present embodiment, similar to the third embodiment, there is so arranged that even unexpected any single or plural address data follow, for example, the address data A (j), as shown by way of example, the subsequent address data as a key data is always monitored. Consequently, also for the advanced reading of data by successive addresses taking no account of a processing procedure of a software in a prefetch operation of a CPU for a higher speed processing, it is possible to implement an extraction of suitable key data and an output of proper data, without malfunction.

Next, there will be described various specific situations on programs which can be incorporated, for the purpose of preventing an illegal copy of softwares, into the data flow control apparatus and/or the memory apparatus according to the present invention, taking into account computer game programs.

Figure 21:
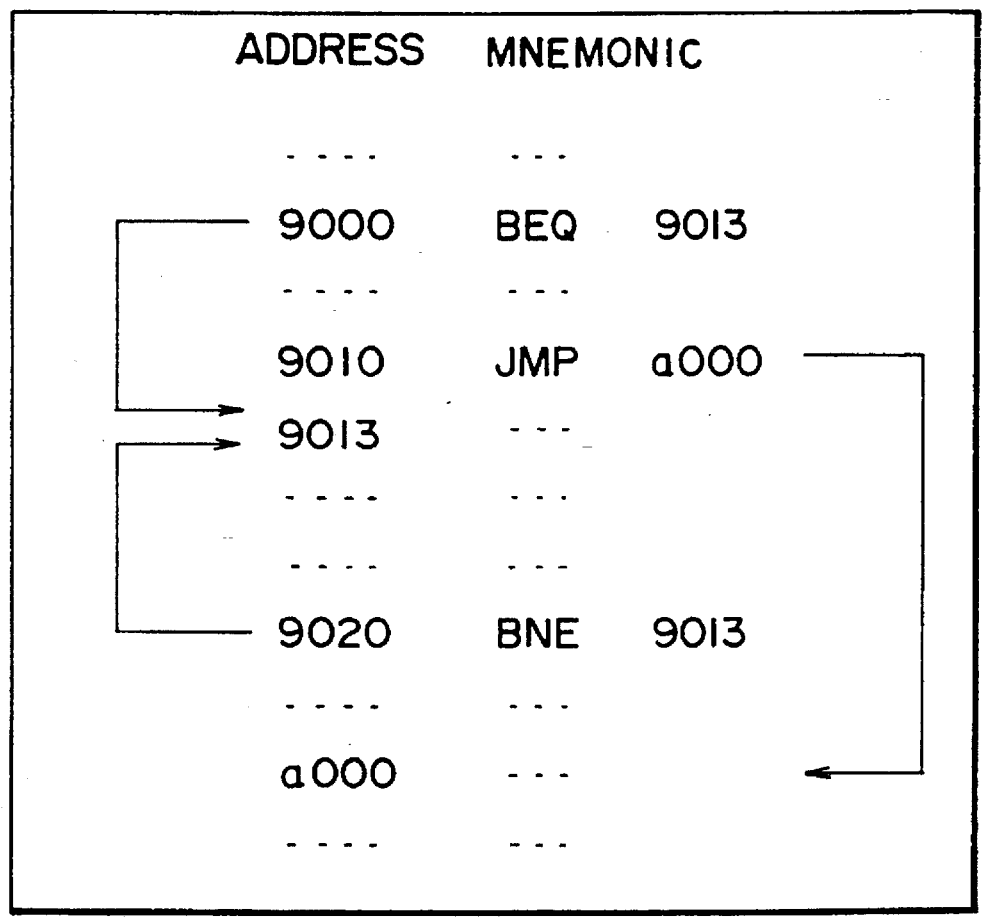
FIG. 21 is an illustration showing the relations between addresses for a storage of a program including a jump instruction and mnemonics.

FIG. 21 is an illustration showing the relations between addresses for a storage of a program including a jump instruction and mnemonics.

'BEQ 9013' stored in address '9000' denotes an instruction representing that if a certain bit of a certain status register is given with a binary number "0", the process jumps to the address '9013', and if not, the subsequent instruction according to the address sequence is executed; 'JMP a000' stored in address '9010' an instruction representing that the process jumps to the address 'a000' without any condition; and 'BNE 9013' stored in address '9020' denotes an instruction representing that if a certain bit of a certain status register is not given with a binary number "0", the process jumps to the address '9013', and if it is "0", the subsequent instruction according to the address sequence is executed.

According to the present program flow, there are paths to the address '9013' from the address '9000' and the address '9020', but there is no path from the adjacent addresses. In this case, ' . . . 9000, 9013, . . . ' and/or ' . . . 9000, 9020, . . . ' may be adopted as arrays of address data (key data), and it is possible to provide such an arrangement that only when the access is conducted in accordance with the sequence of the given array, the proper instructions (data) can be derived.

Here, it is assumed that only when the access is conducted in accordance with an address sequence (or an address sequence and a distance) beforehand registered as the key data, for example an instruction 'LDA #00' which implies that the value '00' is stored in an accumulator, is outputted as data associated with the address '9013', so that the game is operative on a normal basis. This permits an operator to enjoy the most interesting game play which is intended by the developer of the game system. On the other hand, when the access is conducted in accordance with an address sequence which is not registered as the key data, for example, an instruction 'LDA #33', which implies that the value '33' is stored in an accumulator, is outputted as data associated with the address '9013', so that an operation of the game becomes abnormal. Thus, an operator can not enjoy the most interesting game play which is intended by the developer of the game system. An aspect of this example resides in the point that the same instruction is adopted, but only the operands are different. Such a preventive measure from an illegal copy is easily implemented, while makes it difficult to conduct analysis as to the discrimination of error portions and proper operands. Consequently, this example makes it more difficult to conduct an unfair copy practice.

FIG. 22 is an illustration showing the relations between addresses for a storage of a program including a subroutine call instruction and a return instruction and mnemonics.

'JSR 9201' stored in addresses '9000' and '9100' denotes a subroutine call instruction instructing that a subroutine starting from the address '9201' is executed; 'RTS' stored in address '9300' a return instruction instructing the return from the subroutine; and 'RTS' stored in address '9200' an instruction instructing the return of other subroutine.

According to the present program flow, there are paths to the address '9201' (entry point of the subroutine) from the address '9000' and the address '9100', but there is no path from the address immediately before the address '9201'. That is, there is present a discontinuity in address on the program flow between the addresses '9200' and '9201'. Thus, in this case, ' . . . , 9000, 9201, . . . ' and/or ' . . . , 9100, 9021, . . . ' may be adopted as arrays of address data (key data), and it is possible to provide such an arrangement that only when the access is conducted in accordance with the sequence of the given array, the proper instructions (data) can be derived.

Further, according to the present program flow, there are paths to the address '9003' or '9103' (point immediately after the subroutine call instruction) from the address '9300', but there is no path from the addresses '9000' or '9003'. That is, there is present a discontinuity in address on the program flow between the addresses '9000' and '9003', and between the addresses '9100' and '9103'. Thus, in this case, ' . . . 9300, 9003, . . . ' and/or ' . . . 9300, 9103, . . . ' may be adopted as arrays of address data (key data), and it is possible to provide such an arrangement that only when the access is conducted in accordance with the sequence of the given array, the proper instructions (data) can be derived.

Here, it is assumed that only when the access is conducted in accordance with an address sequence (or an address sequence and a distance) beforehand registered as the key data, for example, an instruction 'LDA #00', which implies that the value '00' is stored in an accumulator, is outputted as data associated with the address '9210', so that the game is operative on a normal basis. On the other hand, when the access is conducted in accordance with an address sequence which is not registered as the key data, for example, a subroutine instruction 'RTS' from the subroutine is outputted as data associated with the address '9210', so that the subroutine processing stops in mid way and returns, whereby an operation of the game becomes abnormal. In general, it is not so rare that there are a plurality of return instructions in a single subroutine. Therefore, even though the data which would be obtained through an illegal copy of the software, contain the return instruction 'RTS' in the address '9210', it wouldn't be considered to be so strange. Thus, it is difficult to analyze the copied data. While such a preventive measure from an illegal copy is also easily implemented.

FIG. 23 is an illustration showing the relations between addresses for a storage of a program including a call instruction for instructing a start point of the program when an interruption or a reset is inputted and mnemonics.

'dw irq_int' and 'dw start' stored in addresses 'fffe' and 'fffc' indicate, respectively, that the programs to be executed at the time of the entry of an interruption and at the time of a reset are of the irq_int (address '8100') and the start (address '8000'), respectively.

According to the present program flow, there is path to the start point '8000' (at the time of reset) from the address 'fffc' storing its address, but there is no path from the address immediately before the address '8000'. That is, there is present a discontinuity in address on the program flow between the addresses '8000' and 'fffc'. Thus, in this case, 'fffc, 8000, . . . ' may be adopted as an array of address data, and it is possible to provide such an arrangement that only when the access is conducted in accordance with the sequence of the given array, the proper instructions (data) can be derived. It is same with an interruption as with a reset.

Here, it is assumed that only when the access isconducted in accordance with an address sequence (or an address sequence and a distance) beforehand registered as the key data, for example, an instruction 'STZ 2000', which implies that the content of the memory address '2000' in memory is zero-cleared, is outputted as data associated with the address '8000' or the address '8100'. On the other hand, when the access is conducted in accordance with an address sequence which is not registered as the key data, an instruction 'STZ 2010', which implies that the content of the different memory address '2010' in memory is to be zero-cleared, is outputted as data associated with the address '8000' or the address '8100', whereby an operation of the game becomes abnormal.

In general, immediately after the program starts, it often happens that a memory space is initialized. Hence, as shown in this example, if a memory area to be initialized and/or an initial value are set up to be varied, it may be expected that the different operations are carried out. It is optionally designed that one is concerned with the proper operation, and other the malfunction or no-interesting game operation. In such a case, it is difficult to analyze the copied data. While such a preventive measure from an illegal copy is also easily implemented.

FIG. 24 is an illustration showing the relations between addresses for a storage of a program including a data fetch instruction and mnemonics.

'LDA [10], Y' stored in address '9000' denotes an instruction to instruct a load of data stored in an address formed through adding the number '10' to the value of a direct-register and in addition adding a value of a Y-register. For example, when the program reaches the address '9000', if 'a000' is stored in the direct-register and '100' is stored in the Y-register, the address formed through addition of those addresses becomes 'a110'. Thus, according to this program flow, the address 'a110' appears following the addresses '9000', '9001'. That is, there is present a discontinuity in address on the program flow between the address 'a110' and the address 'a10f' which is located just before the address 'a110'. Thus, in this case, ' . . . , 9000, a110' and the like may be adopted as arrays of address data (key data), and it is possible to provide such an arrangement that only when the access is conducted in accordance with the sequence of the given array, the proper instructions (data) can be derived.

In this case, as data of the address 'a110', for example, the proper value '80' or 'ff' is outputted depending on the situation as to whether or not the access is conducted on the basis of the registered key data. It is not unnatural that any data exists in the data area, different from the instruction code area. Thus, it is very difficult to determine as to whether or not the data read from the address 'a110' is of an error value.

FIG. 25A is an illustration showing the relations between addresses for a storage of a program including a subroutine call instruction and a branch instruction and mnemonics, and FIGS. 25B and 25C each illustrate erroneous data stored in the data flow control apparatus.

There have been stored in advance two arrays which are overlapping in part, as the key data, for example, '9000, 9202' and '9000, 9202, 9210, 9218'. 'LDA' denotes a two byte-instruction. When the access according to the registered key data is conducted, the proper data #00 and #00 as shown in FIG. 25A are outputted, as the value stored in addresses '9202' and '9218' associated with the two byte-instruction 'LDA'. On the other hand, if the address '9202' appears through an access which is different from the access according to the registered key data, there will be outputted erroneous data #ff and #88 as shown in FIGS. 25B and 25C. With respect to the address '9202', even if it appears through the access according to the registered key data, there will be outputted erroneous data #88 as shown in FIG. 25C, with respect to the address '9218', if it appears through an access which is different from the access according to the registered key data.

As explained above, according to this example, there are registered a plurality of arrays (key data) overlapping in part. This makes it possible to provide a double protection such that even if one of a plurality of protection mechanisms consisting of the key data is broken (unfortunately to permit the true copy), the subsequent another protection mechanism is effective to prevent the unfair copy practice.

Next, there will be explained the present invention from a point of view of an address-multiplexing.

Figure 26:
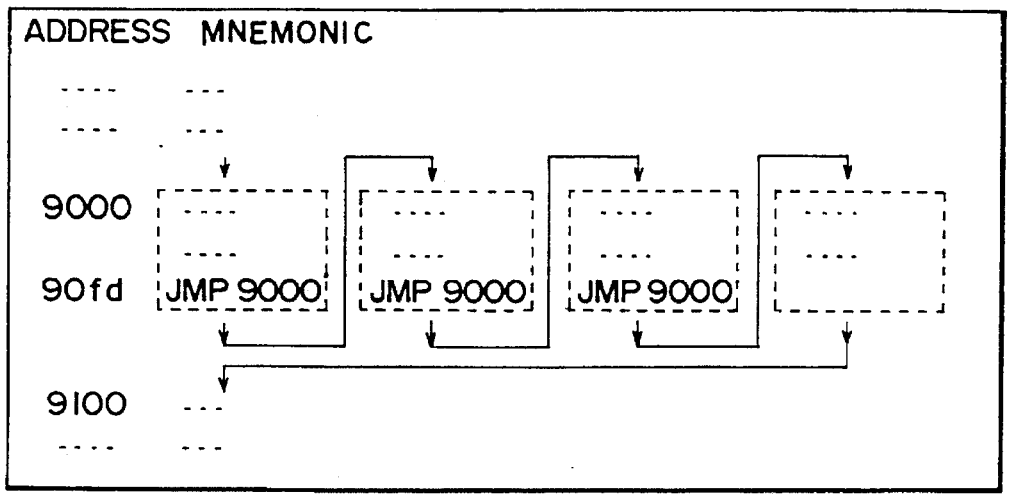
FIG. 26 illustrates a multiplexing program flowchart.

FIG. 26 illustrates a multiplexing program flowchart in which instructions are arranged between the addresses '9000' and '90ff' on a multiplexing basis.

'JMP 9000' stored in addresses '90fd' to '90ff' over three bytes denotes an instruction representing that the program branches to the address '9000' without any condition. In this case, for example, ' . . . 9000, . . . 90fd 9000 . . ,. 90fd, 9000, . . . , 90fd, 9000, . . . , 90fd, . . . ' may be adopted as arrays of address data (key data), and it is possible to provide, as shown in FIG. 26, such an arrangement that instructions are arranged between the the address '9000' and the address '90ff' on a multiplexing basis. In this case, if the the program is read simply in accordance with the sequence of the address, only one of the addresses arranged on a multiplexing basis is simply read, and thus it is impossible to expect a proper operation of the system with the read program.

According to the present example, the address '9000' to the address '90fd' are repeatedly used four times.

'LDA' denotes a two-byte instruction. For the addresses '9000' and '9001' for the first time, the second time, the third time and fourth time, there are defined, for example, 'LDA #00', 'LDA #2a', 'LDA #0f' 'LDA #ee' respectively. In this case, as data associated with the address '9001', a value, which varies in occasions is inputted to the accumulator. In case of the access not according the key data, only the data 'LDA #00' associated with the address '9000' for the first time is outputted. Also in this case, the analysis is very difficult.

Figure 27:
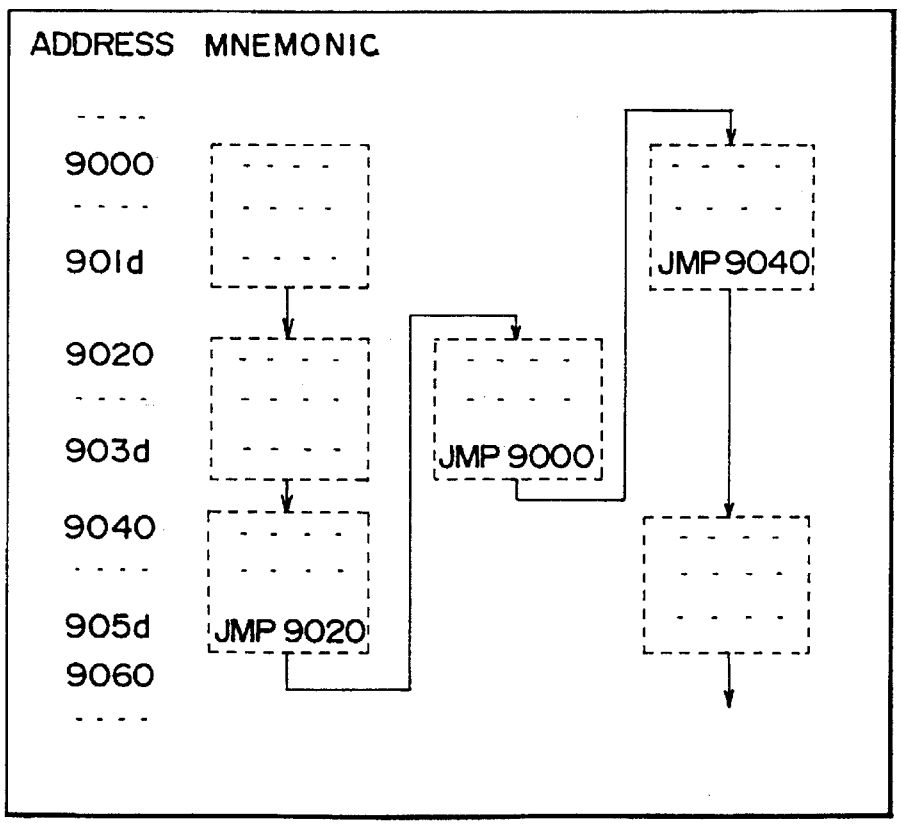
FIG. 27 illustrates another multiplexing program flowchart.

FIG. 27 illustrates another multiplexing program flowchart, which is complicated more than that in FIG. 26.

In this case for example ' . . . 9000, . . . 901d, 9020, . . . , 903d, 9040, . . . , 905d, 9020, . . . , 903d, 9000 . . . , 901d, 9040, . . . , 905d, . . . ', etc. may be adopted as arrays of address data (key data), and it is possible to implement a multiplexing as shown in FIG. 27.

Figures 28A, 28B, 28C, 28D, 28E:
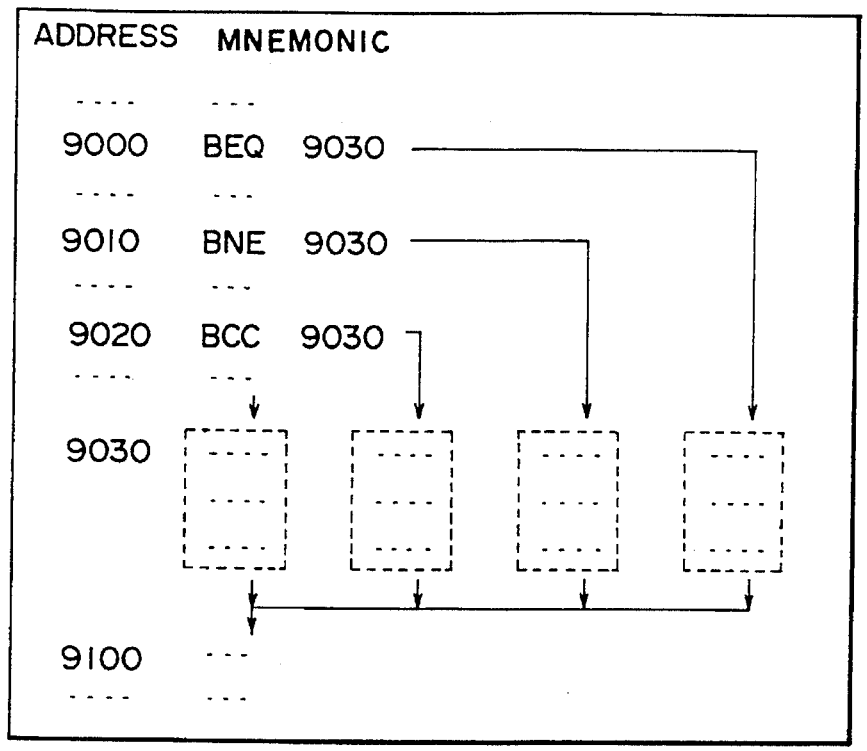
FIG. 28A illustrates still another multiplexing program flowchart, and FIGS. 28B, 28C 28D, and 28E each illustrate a part of the multiplexing program flowchart shown in FIG. 28A.

FIG. 28A illustrates still another multiplexing program flowchart.

BEQ, BNE and BCC each denote a mnemonic representing a branch instruction.

In this case, for example, ' . . . , 9000, 9030 . . . ,', ' . . . , 9010, 9030, . . . ', ' . . . 9020, 9030 . . . ', etc. may be adopted as arrays of address data (key data), and it is possible to implement a multiplexing as shown in FIG. 28A.

FIGS. 28B–28E each show an example of the internal content of the block depicted with a broken line in FIG. 28A.

'JSR' denotes a subroutine call instruction; and 'BRA' an unconditional branch instruction. FIGS. 28B, 28C, 28D and 28E represents that a single subroutine calls five subroutine calls, three subroutine calls, and no subroutine call exist, respectively. According to this example, a subroutine to be called is varied in compliance with a situation as to which registered key data the effected access is associated with. In this circumstance, it is very difficult to discriminate a proper subroutine which permits the game play to be done properly, and thus it is difficult to obtain an exact copy.

Figures 29A, 29B, 29C, 29D, 29E:
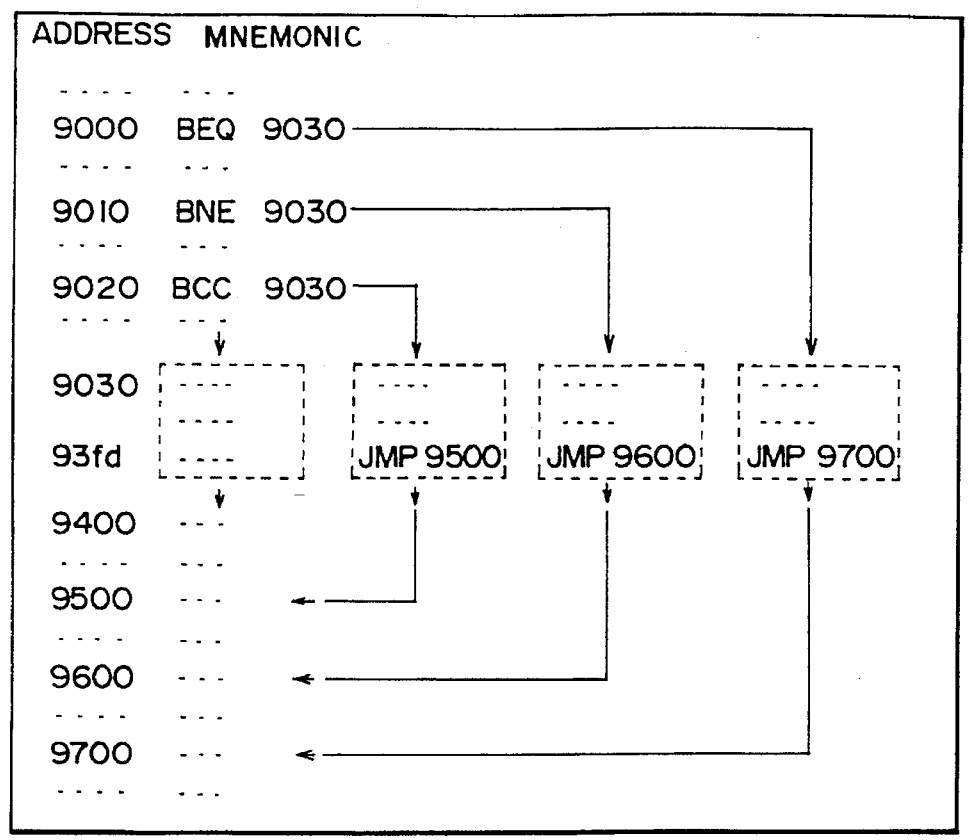
FIG. 29A illustrates still another multiplexing program flowchart, and FIGS. 29B, 29C, 29D, and 29E each illustrate a part of the multiplexing program flowchart shown in FIG. 29A.

FIG. 29A illustrates still another multiplexing program flowchart.

In this case, for example, ' . . . , 9000, 9030, . . . , 93ff, . . . ', ' . . . , 9010, 9030 . . . , 93ff, . . . ', ' . . . , 9020, 9030 . . . , 93ff, . . . ', ' . . . , 902f 9030 . . . , 93ff, . . . ', etc. may be adopted as arrays of address data (key data), and it is possible to implement a multiplexing as shown in FIG. 29A.

FIGS. 29B–29E each show an example of the internal content of the block depicted with a broken line in FIG. 29A.

'STA' denotes an instruction to instruct that the data stored in the accumulator is stored in the memory; 'BNE' a conditional branch instruction; 'CMP' a comparison instruction; 'STZ' a clear instruction to instruct that the memory is cleared; and 'LDY' an instruction to instruct that Y-register is loaded.

According to this example, there are present a plurality of patterns of data after the address '9030', and the processing to be effected is varied in compliance with a situation as to which registered key data the effected access is associated with. In this circumstance, it is difficult to discriminate a proper processing which permits the game play to be done properly, and thus it is difficult to obtain an exact copy.

Figure 30:
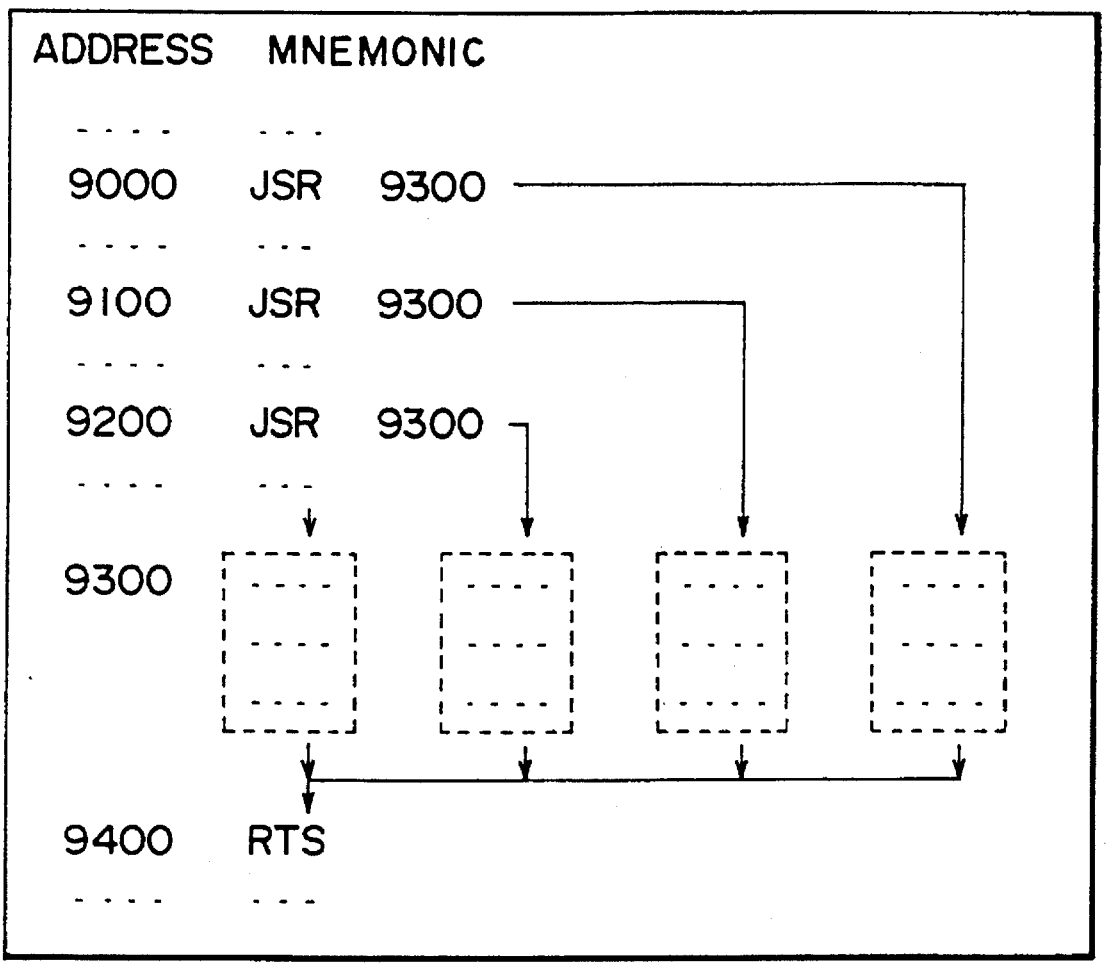
FIGS. 30, 31 and 32 each illustrate another multiplexing program flowchart.
Figure 31:
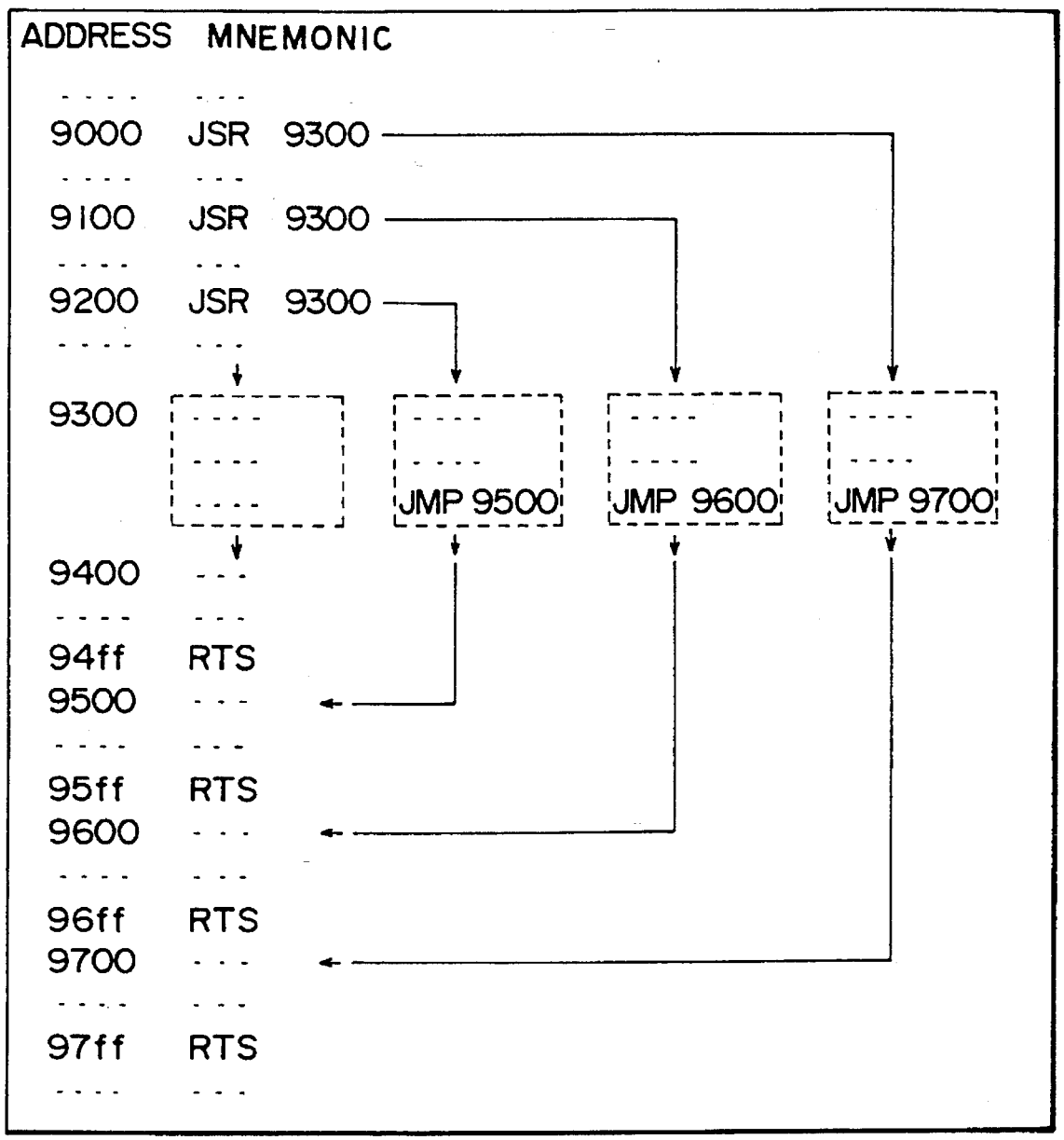

FIGS. 30–31 each illustrate an example of a multiplexing program flowchart including a subroutine call instruction (JSR).

Also in a case where a subroutine call instruction is used other than the branch instruction shown in FIGS. 28 and 29, likewise, an array of address data may be defined.

Figure 32:
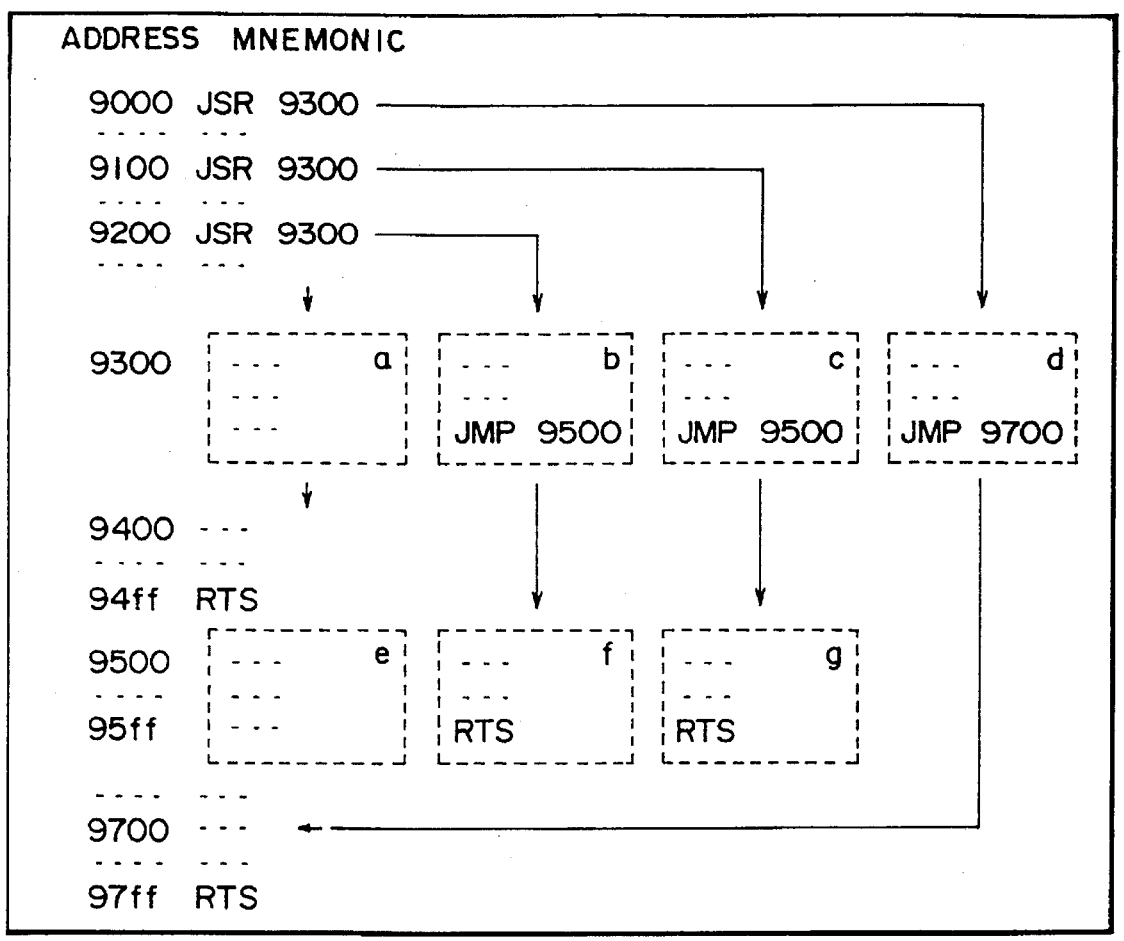

FIG. 32 is an illustration showing the relations between addresses for a storage of a program including a subroutine call instruction and a branch instruction and mnemonics.

In this case, for example, ' . . . , 9000, 9300, . . . , 9700, . . . ,', '9100, 9300 . . . , 9500, . . . ', '9200, 9300 . . . 9500, . . . ', '92ff, 9300, . . . , 9400, . . . ', may be registered as arrays of address data (key data).

According to this example, the address areas '9300' to '93ff' are subjected to the multiplexing, and data to be outputted is different depending on the effected subroutine call. In addition, the address areas '9500' to '95ff' are also subjected to the multiplexing, and data to be outputted is different depending on the effected branch. Hence, if it is intended to conduct a copy of the software through sequentially incrementing addresses, the access will be effected in accordance with the registered key data '93ff, 9300, . . . , 9400, . . . ,'. Therefore, with respect to address areas '9300' to '93ff', only data of the block (a) in FIG. 32 are outputted. On the other hand, with respect to address areas '9500' to '95ff', only data of the block (e) in FIG. 32 are outputted.

In this manner, the presence of a plurality of multiplexing areas makes an analysis and a copy of the system software difficult.

The present invention is not limited to the particular embodiments described above. Various changes and modifications may be made within the spirit and scope of the invention. For example, the present invention can be applied to CD-ROM, floppy-disk and mini-disk which store a particular software program for music, education material, and computer game.

We claim:

1. A data flow control apparatus comprising:

a first input terminal for sequentially receiving a first input data;

a second input terminal for sequentially receiving a second input data;

an output terminal through which output data are sequentially outputted;

memory means for storing one or more replacement data which are defined for associated one or more arrays, respectively, each including a plurality of said first input data; and data switching means for outputting through said output terminal, as said output data, mutually different data which are selected from among a data group in accordance with whether or not a plurality of said first input data, which include an up-to-date first input data entered through said first input terminal and go back from the up-to-date first input data to their inputted order, correspond to any one of said arrays, where said data group consists of a first output data wherein at least a part of bits or the whole bits of said second input data entered from said second input terminal are replaced by said replacement data defined corresponding to said array, a second output data having the same logic as said second input data entered through said second input terminal, a third output data produced through a logical operation based on said first output data, and a fourth output data produced through a logical operation based on both said first output data and said second output data.

2. An apparatus according to claim 1, wherein said data switching means outputs through said output terminal, as said output data, mutually different data which are selected from among a data group in accordance with whether or not a plurality of said first input data, which include an up-to-date first input data entered through said first input terminal and go back from the up-to-date first input data to their inputted order, contain any one of said arrays when it is permitted to insertion of said first input data, which does not constitute said array, within a predetermined number of pieces, among said first input data which constitute said array, where said data group consists of a first output data wherein at least a part of bits or the whole bits of said second input data entered from said second input terminal are replaced by said replacement data defined corresponding to said array, a second output data having the same logic as said second input data entered through said second input terminal, a third output data produced through a logical operation based on said first output data, and a fourth output data produced through a logical operation based on both said first output data and said second output data.

3. An apparatus according to claim 2, wherein said memory means has one or more memory areas adapted for storing said replacement data, feedback data used for a retrieval of said arrays, distance data representative of said predetermined number of pieces and output control data indicating whether or not it is a final stage of the array, and said data switching means comprises:

a register for storing circulating data read from said memory means;

a counter for storing said distance data read out from said memory means and for terminating the retrieval operation for said array in case where said first input data, which do not constitute said array, are inputted through said first input terminal exceeding said predetermined number of pieces determined by said distance data, up to the subsequent said first input data constituting said array is inputted through said first input terminal after storage of said distance data;

data reference means for storing one or more reference retrieval data as an object of retrieval as to whether or not it matches retrieval data consisting of a pair of said first input data entered through said first input terminal and the feedback data stored in said register, and for outputting, when said retrieval data matches any of said reference retrieval data, an access signal to read the replacement data from said memory area in which the replacement data associated with thereference retrieval data detected in match is stored; and data output means for outputting through said output terminal, as said output data, mutually different data which are selected from among a data group in accordance with said output control data among data read from said memory means, where said data group consists of a first output data wherein at least a part of bits or the whole bits of said second input data entered from said second input terminal are replaced by said replacement data read from said memory means, a second output data including said second input data entered through said second input terminal, a third output data produced through a logical operation based on said first output data, and a fourth output data produced through a logical operation based on both said first output data and said second output data.

4. An apparatus according to claim 3, wherein said reference means stores said reference retrieval data defined by a combination of an enhancement transistor and a depletion transistor.

5. An apparatus according to claim 3, wherein said memory means stores said replacement data defined by a combination of an enhancement transistor and a depletion transistor.

6. An apparatus according to claim 1, wherein said data switching means outputs through said output terminal, as said output data, mutually different data which are selected from among a data group in accordance with whether or not a plurality of said first input data, which include an up-to-date first input data entered through said first input terminal and go back from the up-to-date first input data to their inputted order, contain any one of said arrays when it is permitted to insertion of said first input data, which does not constitute said array, among said first input data which constitute said array, where said data group consists of a first output data wherein at least a part of bits or the whole bits of said second input data entered from said second input terminal are replaced by said replacement data defined corresponding to said array, a second output data having the same logic as said second input data entered through said second input terminal, a third output data produced through a logical operation based on said first output data, and a fourth output data produced through a logical operation based on both said first output data and said second output data.

7. An apparatus according to claim 6, wherein said memory means has one or more memory areas adapted for storing said replacement data, feedback data used for a retrieval of said arrays, and output control data indicating whether or not it is a final stage of the array, and said data switching means comprises:

a register for storing feedback data read from said memory means;

data reference means for storing one or more reference retrieval data as an object of retrieval as to whether or not it matches retrieval data consisting of a pair of said first input data entered through said first input terminal and the feedback data stored in said register, and for outputting, when said retrieval data matches any of said reference retrieval data, an access signal to read the replacement data from said memory area in which the replacement data associated with thereference retrieval data detected in match is stored; and data output means for outputting through said output terminal, as said output data, mutually different data which are selected from among a data group in accordance with said output control data among data read from said memory means, where said data group consists of a first output data wherein at least a part of bits or the whole bits of said second input data entered from said second input terminal are replaced by said replacement data read from said memory means, a second output data including said second input data entered through said second input terminal, a third output data produced through a logical operation based on said first output data, and a fourth output data produced through a logical operation based on both said first output data and said second output data.

8. An apparatus according to claim 7, wherein said reference means stores said reference retrieval data defined by a combination of an enhancement transistor and a depletion transistor.

9. An apparatus according to claim 7, wherein said memory means stores said replacement data defined by a combination of an enhancement transistor and a depletion transistor.

10. An apparatus according to claim 1, wherein said memory means has one or more memory areas for storing said replacement data, and said data switching means comprises:

data reference means for storing one or more reference retrieval data as an object of retrieval as to whether or not it matches retrieval data including a plurality of said first input data entered sequentially through said first input terminal, and for outputting, when said retrieval data matches any of said reference retrieval data, an access signal to read the replacement data from said memory area in which the replacement data associated with the reference retrieval data detected in match is stored; and data output means for outputting through said output terminal, as said output data, mutually different data which are selected from among a data group in accordance with whether or not said access signal is present, where said data group consists of a first output data wherein at least a part of bits or the whole bits of said second input data entered from said second input terminal are replaced by said replacement data read from said memory means, a second output data including said second input data entered through said second input terminal, a third output data produced through a logical operation based on said first output data, and a fourth output data produced through a logical operation based on both said first output data and said second output data.

11. An apparatus according to claim 10, wherein said reference means stores said reference retrieval data defined by a combination of an enhancement transistor and a depletion transistor.

12. An apparatus according to claim 10, wherein said memory means stores said replacement data defined by a combination of an enhancement transistor and a depletion transistor.

13. An apparatus according to claim 1, wherein said first input terminal is for inputting as said first input data address data to be inputted to a memory apparatus for storing various data, and said second input terminal is for inputting as said second input data data outputted from said memory apparatus.

14. An apparatus according to claim 1, wherein said memory means stores said replacement data corresponding to a first array including a plurality of said first input data, and said replacement data corresponding to a second array consisting of one or more said first input data disposed subsequent to a plurality of said first input data constituting said first array and said plurality of first input data.

15. An apparatus according to claim 1, wherein said memory means stores a plurality of said replacement data corresponding to a plurality of said arrays each including the same said first input data at the final stage thereof.

16. An apparatus according to claim 1, wherein said first input data is address data representative of an address on a memory in which an instruction to be executed in a CPU is stored, and said array consists of a plurality of address data representative of a plurality of addresses each including an address in which an instruction to be executed on or before a branch instruction is stored, and an address in which an instruction to be executed after the branch instruction is stored, the instruction stored in the later address being involved in an instruction of a branched side to the address apart from an address in which the branch instruction is stored in accordance with the branch instruction.

17. An apparatus according to claim 1, wherein said first input data is address data representative of an address on a memory in which an instruction to be executed in a CPU is stored, and said array consists of a plurality of address data representative of a plurality of addresses each including an address in which an instruction to be executed on or before a subroutine call instruction is stored, and an address in which an instruction to be executed after the subroutine call instruction is stored.

18. An apparatus according to claim 1, wherein said first input data is address data representative of an address on a memory in which an instruction to be executed in a CPU is stored, and said array consists of a plurality of address data representative of a plurality of addresses each including an address in which an instruction to be executed on or before a return instruction is stored, and an address in which an instruction to be executed after the return instruction is stored.

19. An apparatus according to claim 1, wherein said first input data is address data representative of an address on a memory in which an instruction to be executed in a CPU is stored, and said array consists of a plurality of address data representative of a plurality of addresses each including an address in which a call instruction is stored, and an address in which an instruction to be executed after the call instruction is stored, said call instruction instructing, when a predetermined event occurs, a call of a predetermined routine associated event.

20. An apparatus according to claim 1, wherein said first input data is address data representative of an address on a memory in which an instruction to be executed in a CPU and data to be accessed by the CPU are stored, and said array consists of a plurality of address data representative of a plurality of addresses each including an address in which an instruction to be executed on or before a data access instruction to access data on a memory is stored, and an address in which the data accessed by the data access instruction is stored.

21. A memory apparatus comprising:

an input terminal for sequentially receiving an input data;

an output terminal through which output data are sequentially outputted;

a first memory means for storing a plurality of storage data each defined for an associated input data;

a second memory means for storing one or more replacement data which are defined for associated one or more arrays, respectively, each including of a plurality of said input data; and read control means for outputting through said output terminal, as said output data, mutually different data which are selected from among a data group in accordance with whether or not a plurality of input data, which include an up-to-date input data entered through said input terminal and go back from the up-to-date input data to their inputted order, correspond to any one of said arrays, where said data group consists of a first output data wherein at least a part of bits or the whole bits of said storage data defined corresponding to the up-to-date input data are replaced by said replacement data defined corresponding to said array, a second output data having the same logic as said second input data entered through said second input terminal, a third output data produced through a logical operation based on said first output data, and a fourth output data produced through a logical operation based on both said first output data and said second output data.

22. An apparatus according to claim 21, wherein said output data outputted from said output terminal includes data representative of instructions to be executed in a CPU, and said mutually different data outputted from said output terminal are each the same instruction code and representative of instructions of mutually different operands.

23. An apparatus according to claim 22, wherein said mutually different data are to represent instructions to instruct that mutually different values are set to the same register.

24. An apparatus according to claim 22, wherein said mutually different data are instructions to instruct that a predetermined value is stored in mutually different memory addresses.

25. An apparatus according to claim 22, wherein said mutually different data are branch instructions to mutually different addresses.

26. An apparatus according to claim 21, wherein said read control means outputs through said output terminal, as said output data, mutually different data which are selected from among a data group in accordance with whether or not a plurality of said input data, which include an up-to-date input data entered through said input terminal and go back from the up-to-date input data to their inputted order, contain any one of said arrays when it is permitted to insertion of said input data, which does not constitute said array, among said input data which constitute said array, where said data group consists of a first output data wherein at least a part of bits or the whole bits of said storage data defined corresponding to the up-to-date input data are replaced by said replacement data defined corresponding to said array, a second output data having the same logic as said second input data entered through said second input terminal, a third output data produced through a logical operation based on said first output data, and a fourth output data produced through a logical operation based on both said first output data and said second output data.

27. An apparatus according to claim 21, wherein said read control means outputs through said output terminal, as said output data, mutually different data which are selected from among a data group in accordance with whether or not a plurality of said input data, which include an up-to-date input data entered through said input terminal and go back from the up-to-date input data to their inputted order, contain any one of said arrays when it is permitted to insertion of said input data, which does not constitute said array, within a predetermined number of pieces, between said input data to said data which constitute said array, where said data group consists of a first output data wherein at least a part of bits or the whole bits of said storage data defined corresponding to the up-to-date input data are replaced by said replacement data defined corresponding to said array, a second output data having the same logic as said second input data entered through said second input terminal, a third output data produced through a logical operation based on said first output data, and a fourth output data produced through a logical operation based on both said first output data and said second output data.

28. An apparatus according to claim 21, wherein said input data is address data.

29. An apparatus according to claim 21, wherein said output data outputted from said output terminal includes data representative of instructions to be executed in a CPU, and at least one of said mutually different data outputted from said output terminal are to represent a return instruction.

30. An apparatus according to claim 21, wherein said output data outputted from said output terminal includes data representative of instructions to be executed in a CPU, and said mutually different data outputted from said output terminal are to represent mutually different instructions.

31. An apparatus according to claim 21, wherein said output data outputted from said output terminal includes data representative of instructions to be executed in a CPU, said data being referred to with a predetermined instruction, and said mutually different data outputted from said output terminal are mutually different values of data which are referred to with said predetermined instruction.

32. A data flow control apparatus comprising:

a first input terminal for sequentially receiving a first input data;

a second input terminal for sequentially receiving a second input data;

an output terminal through which output data are sequentially outputted;

memory means for storing one or more replacement data which are defined for associated one or more arrays, respectively, each including a plurality of said first input data, and feedback data defined corresponding to said first input data included in at least one of said arrays;

a register for storing feedback data read from said memory means;

a selector for receiving the second input data inputted through said second input terminal and the replacement data read from said memory means to output through said output terminal, as said output data, said second input data, or data wherein at least a part of bits or the whole bits of said second input data entered from said second input terminal are replaced by said replacement data, in accordance with a predetermined control signal;

match detection means for storing reference retrieval data, each consisting of a pair of said first input data included in any one of said arrays and said feedback data defined corresponding to said first input data disposed immediately before the associated said input first data, in associated reference retrieved data memory area corresponding to the respective first input data including in any one of said arrays, comparing said reference retrieval data with retrieval data consisting of a pair of said first input data entered through said first input terminal and said feedback data read from said memory means and stored in said register, and outputting a match signal on a signal line associated with said reference retrieval data memory area in which said reference retrieval data matching said retrieval data is stored, and control means for providing such a control that upon receipt of said match signal appearing on said signal line, said feedback data, which is defined corresponding to said said feedback data, which is defined corresponding to said first input data constituting said reference retrieval data stored in said reference retrieval data memory area associated with said signal line appearing said match signal, is read from said memory means and stored in said register, and in accordance with whether or not said first input data constituting said retrieval data is said first input data disposed at a final stage of any one of said arrays, said replacement data defined for the associated array is read from said memory so that data wherein at least a part of bits or the whole bits of said second input data entered from said second input terminal are replaced by said replacement data is outputted through said selector, or said second data entered from said second input means is outputted through said selector.

33. A data flow control apparatus comprising:

a first input terminal for sequentially receiving a first input data;

a second input terminal for sequentially receiving a second input data;

an output terminal through which output data are sequentially outputted;

memory means for storing one or more replacement data which are defined for associated one or more arrays, respectively, each including a plurality of said first input data, feedback data defined corresponding to said first input data included in at least one of said arrays, and distance data defined for said first input data as an index indicating that when said first input data is inputted through said first input terminal, and thereafter first input data, which is disposed immediately after the preceding said first data constituting said array including the entered preceding said first data, is inputted, how many pieces of other said first input data not constituting said array is acceptable to be inputted through said first input terminal, a register for storing feedback data read from said memory means;

a counter for storing said distance data read out from said memory means and for terminating the retrieval operation for said array when the number of pieces of said other first input data not constituting said array exceeds the number of pieces determined by said distance data between adjacent two first input constituting said array of interest through comparing the number of pieces of said other first input data entered through said first input terminal after storage of the distance data with said distance data;

a selector for receiving the second input data inputted through said second input terminal and the replacement data read from said memory means to output through said output terminal, as said output data, said second input data, or data wherein at least a part of bits or the whole bits of said second input data entered from said second input terminal are replaced by said replacement data, in accordance with a predetermined control signal;

match detection means for storing reference retrieval data, each including of a pair of said first input data included in any one of said arrays and said feedback data defined corresponding to said first input data disposed immediately before the associated said input first data, in associated reference retrieval data memory area corresponding to the respective first input data included in any one of said arrays, comparing said reference retrieval data with retrieval data consisting of a pair of said first input data entered through said first input terminal and said feedback data read from said memory means and stored in said register, and outputting a match signal on a signal line associated with said reference retrieval data memory area in which said reference retrieval data matching with said retrieval data is stored, and control means for providing such a control that upon receipt of said match signal appearing on said signal line, said feedback data, which is defined corresponding to said first input data constituting said reference retrieval data stored in said reference retrieval data memory area associated with said signal line appearing said match signal, is read from said memory means and stored in said register and said counter, and in accordance with whether or not said first input data constituting said retrieval data is said first input data disposed at a final stage of any one of said arrays, said replacement data defined for the associated array is read from said memory means so that data wherein at least a part of bits or the whole bits of said second input data entered from said second input terminal are replaced by said replacement data is outputted through said selector, or said second data entered from said second input means is outputted through said selector.

* * * * *